(12) United States Patent
Matsuyama

(10) Patent No.: US 8,564,813 B2
(45) Date of Patent: Oct. 22, 2013

(54) DISTRIBUTED PRINTING SYSTEM, PRINT CONTROL METHOD FOR DETERMINING PRINTING OUTPUT LOCATIONS ACCORDING TO CONTENT AND ESTIMATED TIME INFORMATION, AND PROGRAM

(75) Inventor: Yoichi Matsuyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1107 days.

(21) Appl. No.: 12/539,481

(22) Filed: Aug. 11, 2009

(65) Prior Publication Data
US 2010/0165376 A1 Jul. 1, 2010

(30) Foreign Application Priority Data
Aug. 29, 2008 (JP) ................................ 2008-222616

(51) Int. Cl.
G06F 3/12 (2006.01)
(52) U.S. Cl.
USPC ............. 358/1.15; 358/1.14; 710/15; 710/16; 710/17; 710/18; 710/19; 718/105
(58) Field of Classification Search
USPC ........................................................ 358/1.15
See application file for complete search history.

(56) References Cited

U.S. PATENT DOCUMENTS

| 6,970,261 B1* | 11/2005 | Robles ........................ 358/1.15 |
| 2001/0019422 A1 | 9/2001 | Hara | |
| 2004/0008366 A1* | 1/2004 | Ferlitsch ...................... 358/1.15 |
| 2004/0179230 A1* | 9/2004 | Kitada et al. .................. 358/1.15 |
| 2004/0190042 A1* | 9/2004 | Ferlitsch et al. .............. 358/1.15 |
| 2005/0024672 A1* | 2/2005 | Guster et al. .................. 358/1.14 |
| 2005/0237571 A1* | 10/2005 | Motamed et al. ............. 358/1.15 |
| 2006/0244991 A1* | 11/2006 | Tenger et al. .................. 358/1.15 |
| 2007/0127063 A1* | 6/2007 | Fertlitsch et al. ............. 358/1.15 |
| 2007/0146772 A1* | 6/2007 | Castellani ..................... 358/1.15 |
| 2007/0165266 A1* | 7/2007 | Tian ............................. 358/1.15 |
| 2007/0201078 A1* | 8/2007 | Morales et al. ................ 358/1.15 |
| 2008/0204794 A1* | 8/2008 | Watterson et al. ............ 358/1.15 |
| 2008/0246986 A1* | 10/2008 | Scrafford et al. ............. 358/1.15 |

FOREIGN PATENT DOCUMENTS

| JP | 2001-290627 A | 10/2001 |
| JP | 2002-259095 A | 9/2002 |
| JP | 2005-010945 A | 1/2005 |
| JP | 2005-031859 A | 2/2005 |
| JP | 2007-279843 A | 10/2007 |

* cited by examiner

*Primary Examiner* — Benjamin O Dulaney
(74) *Attorney, Agent, or Firm* — Canon USA Inc IP Division

(57) ABSTRACT

A printing system includes an order management server configured to receive printing orders placed from a plurality of order placement location apparatuses via a network and to distribute the received printing orders to the plurality of printing location apparatuses via the network. Each printing location apparatus includes a notification unit configured to notify a printing order estimated time. The order management server includes a storage unit configured to store a plurality of printing orders placed from the order placement location apparatuses, an updating unit configured to update printing order estimated time information from each printing location apparatus, a determination unit configured to determine a printing location apparatus or apparatuses to which to distribute the plurality of printing orders according to a content of each printing order and the printing order estimated time information, and a transfer unit configured to transfer the printing orders to the printing location apparatus or apparatuses determined by the determination unit.

8 Claims, 20 Drawing Sheets

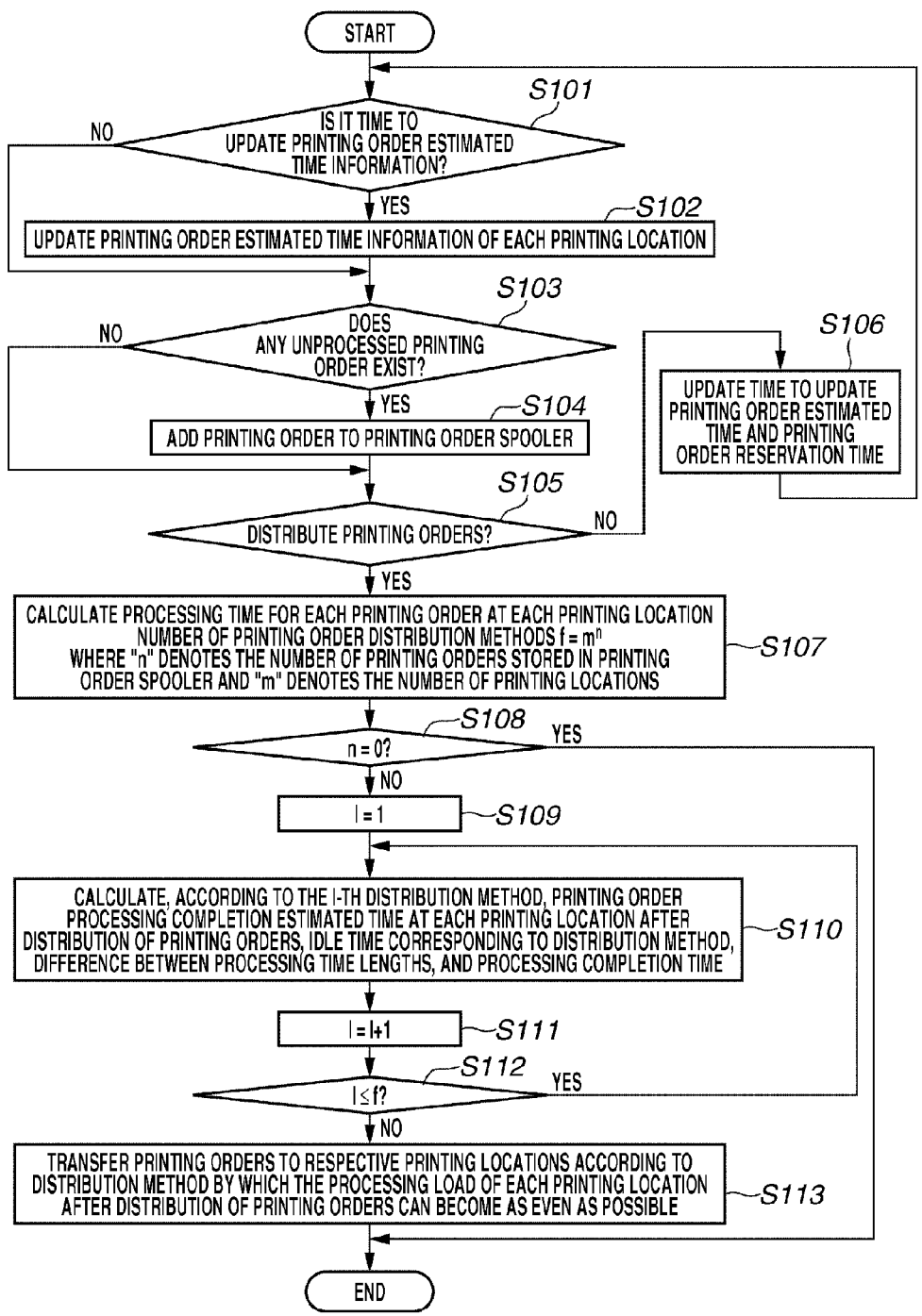

FIG.4A

| PRINTING LOCATION | PRINTING ARTICLE | WAIT TIME (MINs) | PROCESSING TIME (MINs) |
|---|---|---|---|
| A | A | 10 | 20 |
| | B | 0 | 10 |
| | C | 100 | 15 |
| | D | 30 | 10 |
| | TOTAL | 140 | |
| B | A | 30 | 20 |
| | B | 30 | 10 |
| | C | 20 | 15 |
| | D | 80 | 10 |
| | TOTAL | 160 | |
| C | A | 60 | 10 |
| | B | 60 | 5 |
| | C | 20 | 15 |
| | D | 10 | 10 |
| | TOTAL | 150 | |

400 — (table)
208 — A
212 — B
216 — C

FIG.4B

| PRINTING LOCATION | PRINTING ARTICLE | WAIT TIME (MINs) | PROCESSING TIME (MINs) | PROCESSING TIME FOR ORDER 1 (MINs) | PROCESSING TIME FOR ORDER 2 (MINs) | PROCESSING TIME FOR ORDER 3 (MINs) 401 |
|---|---|---|---|---|---|---|
| A | A | 10 | 20 | 40 | 0 | 20 |
|   | B | 0 | 10 | 0 | 30 | 10 |
|   | C | 100 | 15 | 15 | 15 | 60 |
|   | D | 30 | 10 | 0 | 0 | 10 |
|   | TOTAL | 140 |   | 55 | 45 | 100 |
| B | A | 30 | 20 | 40 | 0 | 20 |
|   | B | 30 | 10 | 0 | 30 | 10 |
|   | C | 20 | 15 | 15 | 15 | 60 |
|   | D | 80 | 10 | 0 | 0 | 10 |
|   | TOTAL | 160 |   | 55 | 45 | 100 |
| C | A | 60 | 10 | 20 | 0 | 10 |
|   | B | 60 | 5 | 0 | 15 | 5 |
|   | C | 20 | 15 | 15 | 15 | 60 |
|   | D | 10 | 10 | 0 | 0 | 10 |
|   | TOTAL | 150 |   | 35 | 30 | 85 |

FIG.5A

```
<?xml version="1.0" encoding="Shift_JIS"?>
 <PrintOrder ID="1">
  <Customer>
   <ID>01234</ID>
  </Customer>
  <Item type="A" count=2>
   <Data>manual0.5.pdf</Data>
  </Item>
  <Item type="C" count=1>
   <Data>poster0.1.pdf</Data>
  </Item>
 </PrintOrder>
</xml>
```

FIG.5B

| PRINTING ORDER ID | CUSTOMER ID | DATA FILE | NUMBER OF PRINTING ARTICLES A | NUMBER OF PRINTING ARTICLES B | NUMBER OF PRINTING ARTICLES C | NUMBER OF PRINTING ARTICLES D |
|---|---|---|---|---|---|---|
| 1 | 1234 | order1.zip | 2 | 0 | 1 | 0 |
| 2 | 56 | order2.zip | 0 | 3 | 1 | 0 |
| 3 | 3498 | order3.zip | 1 | 1 | 4 | 1 |

| COMBINATION NO. | PRINTING ORDER DISTRIBUTION DESTINATION | | | PRINTING ORDER PROCESSING COMPLETION ESTIMATED TIME AT EACH PRINTING LOCATION AFTER DISTRIBUTION OF PRINTING ORDERS (MINs) | | | IDLE TIME (MINs) | DIFFERENCE BETWEEN PROCESSING TIME LENGTHS (MINs) | PROCESSING COMPLETION TIME (MINs) |
|---|---|---|---|---|---|---|---|---|---|
| | PRINTING ORDER 1 | PRINTING ORDER 2 | PRINTING ORDER 3 | PRINTING LOCATION 208 | PRINTING LOCATION 212 | PRINTING LOCATION 216 | | | |
| 1 | PRINTING LOCATION 208 | PRINTING LOCATION 208 | PRINTING LOCATION 208 | 340 | 160 | 150 | 370 | 190 | 340 |
| 2 | PRINTING LOCATION 208 | PRINTING LOCATION 208 | PRINTING LOCATION 212 | 240 | 260 | 150 | 130 | 110 | 260 |
| 3 | PRINTING LOCATION 208 | PRINTING LOCATION 208 | PRINTING LOCATION 216 | 240 | 160 | 235 | 85 | 80 | 240 |
| 4 | PRINTING LOCATION 208 | PRINTING LOCATION 212 | PRINTING LOCATION 208 | 295 | 205 | 150 | 235 | 145 | 295 |
| 5 | PRINTING LOCATION 208 | PRINTING LOCATION 212 | PRINTING LOCATION 212 | 195 | 305 | 150 | 265 | 155 | 305 |
| 6 | PRINTING LOCATION 208 | PRINTING LOCATION 212 | PRINTING LOCATION 216 | 195 | 205 | 235 | 70 | 40 | 235 |
| 7 | PRINTING LOCATION 208 | PRINTING LOCATION 216 | PRINTING LOCATION 208 | 295 | 160 | 180 | 250 | 135 | 295 |
| 8 | PRINTING LOCATION 208 | PRINTING LOCATION 216 | PRINTING LOCATION 212 | 195 | 260 | 180 | 145 | 80 | 260 |
| 9 | PRINTING LOCATION 208 | PRINTING LOCATION 216 | PRINTING LOCATION 216 | 195 | 160 | 265 | 175 | 105 | 265 |
| 10 | PRINTING LOCATION 212 | PRINTING LOCATION 208 | PRINTING LOCATION 208 | 285 | 215 | 150 | 205 | 135 | 285 |
| 11 | PRINTING LOCATION 212 | PRINTING LOCATION 208 | PRINTING LOCATION 212 | 185 | 315 | 150 | 295 | 165 | 315 |
| 12 | PRINTING LOCATION 212 | PRINTING LOCATION 208 | PRINTING LOCATION 216 | 185 | 215 | 235 | 70 | 50 | 235 |
| 13 | PRINTING LOCATION 212 | PRINTING LOCATION 208 | PRINTING LOCATION 208 | 240 | 260 | 150 | 130 | 110 | 260 |
| 14 | PRINTING LOCATION 212 | PRINTING LOCATION 212 | PRINTING LOCATION 212 | 140 | 360 | 150 | 430 | 220 | 360 |

FIG. 6B

| COMBINATION NO. | PRINTING ORDER DISTRIBUTION DESTINATION ||| PRINTING ORDER PROCESSING COMPLETION ESTIMATED TIME AT EACH PRINTING LOCATION AFTER DISTRIBUTION OF PRINTING ORDERS (MINs) ||| IDLE TIME (MINs) | DIFFERENCE BETWEEN PROCESSING TIME LENGTHS (MINs) | PROCESSING COMPLETION TIME (MINs) |
|---|---|---|---|---|---|---|---|---|---|
| | PRINTING ORDER 1 | PRINTING ORDER 2 | PRINTING ORDER 3 | PRINTING LOCATION 208 | PRINTING LOCATION 212 | PRINTING LOCATION 216 | | | |
| 15 | PRINTING LOCATION 212 | PRINTING LOCATION 212 | PRINTING LOCATION 216 | 140 | 260 | 235 | 145 | 120 | 260 |
| 16 | PRINTING LOCATION 212 | PRINTING LOCATION 216 | PRINTING LOCATION 208 | 240 | 215 | 180 | 85 | 60 | 240 |
| 17 | PRINTING LOCATION 212 | PRINTING LOCATION 216 | PRINTING LOCATION 212 | 140 | 315 | 180 | 310 | 175 | 315 |
| 18 | PRINTING LOCATION 212 | PRINTING LOCATION 216 | PRINTING LOCATION 216 | 140 | 215 | 265 | 175 | 125 | 265 |
| 19 | PRINTING LOCATION 216 | PRINTING LOCATION 208 | PRINTING LOCATION 208 | 285 | 160 | 185 | 225 | 125 | 285 |
| 20 | PRINTING LOCATION 216 | PRINTING LOCATION 208 | PRINTING LOCATION 212 | 185 | 260 | 185 | 150 | 75 | 260 |
| 21 | PRINTING LOCATION 216 | PRINTING LOCATION 208 | PRINTING LOCATION 216 | 185 | 160 | 270 | 195 | 110 | 270 |
| 22 | PRINTING LOCATION 216 | PRINTING LOCATION 212 | PRINTING LOCATION 208 | 240 | 205 | 185 | 90 | 55 | 240 |
| 23 | PRINTING LOCATION 216 | PRINTING LOCATION 212 | PRINTING LOCATION 212 | 140 | 305 | 185 | 285 | 165 | 305 |
| 24 | PRINTING LOCATION 216 | PRINTING LOCATION 212 | PRINTING LOCATION 216 | 140 | 205 | 270 | 195 | 130 | 270 |
| 25 | PRINTING LOCATION 216 | PRINTING LOCATION 216 | PRINTING LOCATION 208 | 240 | 160 | 215 | 105 | 80 | 240 |
| 26 | PRINTING LOCATION 216 | PRINTING LOCATION 216 | PRINTING LOCATION 212 | 140 | 260 | 215 | 165 | 120 | 260 |
| 27 | PRINTING LOCATION 216 | PRINTING LOCATION 216 | PRINTING LOCATION 216 | 140 | 160 | 300 | 300 | 160 | 300 |

| COMBINATION NO. | PRINTING ORDER DISTRIBUTION DESTINATION | | | PRINTING ORDER PROCESSING COMPLETION ESTIMATED TIME AT EACH PRINTING LOCATION AFTER DISTRIBUTION OF PRINTING ORDERS (MINs) | | | IDLE TIME (MINs) | DIFFERENCE BETWEEN PROCESSING TIME LENGTHS (MINs) | PROCESSING COMPLETION TIME (MINs) |
|---|---|---|---|---|---|---|---|---|---|
| | PRINTING ORDER 1 | PRINTING ORDER 2 | PRINTING ORDER 3 | PRINTING LOCATION 208 | PRINTING LOCATION 212 | PRINTING LOCATION 216 | | | |
| 1 | PRINTING LOCATION 208 | PRINTING LOCATION 208 | PRINTING LOCATION 208 | 240 | 0 | 0 | 480 | 240 | 240 |
| 2 | PRINTING LOCATION 208 | PRINTING LOCATION 208 | PRINTING LOCATION 212 | 160 | 80 | 0 | 240 | 160 | 160 |
| 3 | PRINTING LOCATION 208 | PRINTING LOCATION 208 | PRINTING LOCATION 216 | 160 | 0 | 40 | 280 | 160 | 160 |
| 4 | PRINTING LOCATION 208 | PRINTING LOCATION 212 | PRINTING LOCATION 208 | 120 | 120 | 0 | 120 | 120 | 120 |
| 5 | PRINTING LOCATION 208 | PRINTING LOCATION 212 | PRINTING LOCATION 212 | 40 | 200 | 0 | 360 | 200 | 200 |
| 6 | PRINTING LOCATION 208 | PRINTING LOCATION 212 | PRINTING LOCATION 216 | 40 | 120 | 40 | 160 | 80 | 120 |
| 7 | PRINTING LOCATION 208 | PRINTING LOCATION 216 | PRINTING LOCATION 208 | 120 | 0 | 30 | 210 | 120 | 120 |
| 8 | PRINTING LOCATION 208 | PRINTING LOCATION 216 | PRINTING LOCATION 212 | 40 | 80 | 60 | 60 | 40 | 80 |
| 9 | PRINTING LOCATION 208 | PRINTING LOCATION 216 | PRINTING LOCATION 216 | 40 | 0 | 100 | 160 | 100 | 100 |
| 10 | PRINTING LOCATION 212 | PRINTING LOCATION 208 | PRINTING LOCATION 208 | 200 | 40 | 0 | 360 | 200 | 200 |
| 11 | PRINTING LOCATION 212 | PRINTING LOCATION 208 | PRINTING LOCATION 212 | 120 | 120 | 0 | 120 | 120 | 120 |
| 12 | PRINTING LOCATION 212 | PRINTING LOCATION 208 | PRINTING LOCATION 216 | 120 | 40 | 40 | 160 | 80 | 120 |
| 13 | PRINTING LOCATION 212 | PRINTING LOCATION 212 | PRINTING LOCATION 208 | 80 | 160 | 0 | 240 | 160 | 160 |
| 14 | PRINTING LOCATION 212 | PRINTING LOCATION 212 | PRINTING LOCATION 212 | 0 | 240 | 0 | 480 | 240 | 240 |

| COMBINATION NO. | PRINTING ORDER DISTRIBUTION DESTINATION | | | PRINTING ORDER PROCESSING COMPLETION ESTIMATED TIME AT EACH PRINTING LOCATION AFTER DISTRIBUTION OF PRINTING ORDERS (MINs) | | | IDLE TIME (MINs) | DIFFERENCE BETWEEN PROCESSING TIME LENGTHS (MINs) | PROCESSING COMPLETION TIME (MINs) |
|---|---|---|---|---|---|---|---|---|---|
| | PRINTING ORDER 1 | PRINTING ORDER 2 | PRINTING ORDER 3 | PRINTING LOCATION 208 | PRINTING LOCATION 212 | PRINTING LOCATION 216 | | | |
| 15 | PRINTING LOCATION 212 | PRINTING LOCATION 212 | PRINTING LOCATION 216 | 0 | 160 | 40 | 280 | 160 | 160 |
| 16 | PRINTING LOCATION 212 | PRINTING LOCATION 216 | PRINTING LOCATION 208 | 80 | 40 | 60 | 60 | 40 | 80 |
| 17 | PRINTING LOCATION 212 | PRINTING LOCATION 216 | PRINTING LOCATION 212 | 0 | 120 | 60 | 180 | 120 | 120 |
| 18 | PRINTING LOCATION 212 | PRINTING LOCATION 216 | PRINTING LOCATION 216 | 0 | 40 | 100 | 160 | 100 | 100 |
| 19 | PRINTING LOCATION 216 | PRINTING LOCATION 208 | PRINTING LOCATION 208 | 200 | 0 | 20 | 380 | 200 | 200 |
| 20 | PRINTING LOCATION 216 | PRINTING LOCATION 208 | PRINTING LOCATION 212 | 120 | 80 | 20 | 140 | 100 | 120 |
| 21 | PRINTING LOCATION 216 | PRINTING LOCATION 208 | PRINTING LOCATION 216 | 120 | 0 | 60 | 180 | 60 | 120 |
| 22 | PRINTING LOCATION 216 | PRINTING LOCATION 212 | PRINTING LOCATION 208 | 80 | 120 | 20 | 140 | 100 | 120 |
| 23 | PRINTING LOCATION 216 | PRINTING LOCATION 212 | PRINTING LOCATION 212 | 0 | 200 | 20 | 380 | 200 | 200 |
| 24 | PRINTING LOCATION 216 | PRINTING LOCATION 212 | PRINTING LOCATION 216 | 0 | 120 | 60 | 180 | 120 | 120 |
| 25 | PRINTING LOCATION 216 | PRINTING LOCATION 216 | PRINTING LOCATION 208 | 80 | 0 | 80 | 80 | 80 | 80 |
| 26 | PRINTING LOCATION 216 | PRINTING LOCATION 216 | PRINTING LOCATION 212 | 0 | 80 | 80 | 80 | 80 | 80 |
| 27 | PRINTING LOCATION 216 | PRINTING LOCATION 216 | PRINTING LOCATION 216 | 0 | 0 | 120 | 240 | 120 | 120 |

| PRINTING ORDER ID | CUSTOMER ID | DATA FILE | NUMBER OF PRINTING ARTICLES A | NUMBER OF PRINTING ARTICLES B | NUMBER OF PRINTING ARTICLES C | NUMBER OF PRINTING ARTICLES D |
|---|---|---|---|---|---|---|
| 1 | 1234 | order1.zip | 1 | 0 | 1 | 0 |
| 2 | 56 | order2.zip | 0 | 1 | 1 | 0 |
| 3 | 3498 | order3.zip | 1 | 1 | 1 | 1 |

701

| PRINTING LOCATION | PRINTING ARTICLE | WAIT TIME (MINs) | PROCESSING TIME (MINs) |
|---|---|---|---|
| 212 | A | 30 | 20 |
| | B | 30 | 10 |
| | C | 20 | 15 |
| | D | 80 | 10 |
| | TOTAL | 160 | |
| 216 | A | 60 | 10 |
| | B | 60 | 5 |
| | C | 20 | 15 |
| | D | 10 | 10 |
| | TOTAL | 150 | |

702

| PRINTING LOCATION | PRINTING ARTICLE | WAIT TIME (MINs) | PROCESSING TIME (MINs) | PROCESSING TIME FOR ORDER 1 (MINs) | PROCESSING TIME FOR ORDER 2 (MINs) | PROCESSING TIME FOR ORDER 3 (MINs) |
|---|---|---|---|---|---|---|
| 212 | A | 30 | 20 | 20 | 0 | 20 |
| | B | 30 | 10 | 0 | 10 | 10 |
| | C | 20 | 15 | 15 | 15 | 15 |
| | D | 80 | 10 | 0 | 0 | 10 |
| | TOTAL | 160 | | 35 | 25 | 55 |
| 216 | A | 60 | 10 | 10 | 0 | 10 |
| | B | 60 | 5 | 0 | 5 | 5 |
| | C | 20 | 15 | 15 | 15 | 15 |
| | D | 10 | 10 | 0 | 0 | 10 |
| | TOTAL | 150 | | 25 | 20 | 40 |

FIG.11B

| COMBINATION NO. | PRINTING ORDER DISTRIBUTION DESTINATION ||| PRINTING ORDER PROCESSING COMPLETION ESTIMATED TIME AT EACH PRINTING LOCATION AFTER DISTRIBUTION OF PRINTING ORDERS (MINs) || IDLE TIME (MINs) | DIFFERENCE BETWEEN PROCESSING TIME LENGTHS (MINs) | PROCESSING COMPLETION TIME (MINs) |
|---|---|---|---|---|---|---|---|---|
| | PRINTING ORDER 1 | PRINTING ORDER 2 | PRINTING ORDER 3 | PRINTING LOCATION B | PRINTING LOCATION C | | | |
| 1 | PRINTING LOCATION B | PRINTING LOCATION B | PRINTING LOCATION B | 275 | 150 | 125 | 125 | 275 |
| 2 | PRINTING LOCATION B | PRINTING LOCATION B | PRINTING LOCATION C | 220 | 190 | 30 | 30 | 220 |
| 3 | PRINTING LOCATION B | PRINTING LOCATION C | PRINTING LOCATION B | 250 | 170 | 80 | 80 | 250 |
| 4 | PRINTING LOCATION B | PRINTING LOCATION C | PRINTING LOCATION B | 195 | 210 | 15 | 15 | 210 |
| 5 | PRINTING LOCATION C | PRINTING LOCATION B | PRINTING LOCATION B | 240 | 175 | 65 | 65 | 240 |
| 6 | PRINTING LOCATION C | PRINTING LOCATION B | PRINTING LOCATION C | 185 | 215 | 30 | 30 | 215 |
| 7 | PRINTING LOCATION C | PRINTING LOCATION C | PRINTING LOCATION B | 215 | 195 | 20 | 20 | 215 |
| 8 | PRINTING LOCATION C | PRINTING LOCATION C | PRINTING LOCATION C | 160 | 235 | 75 | 75 | 235 |

703

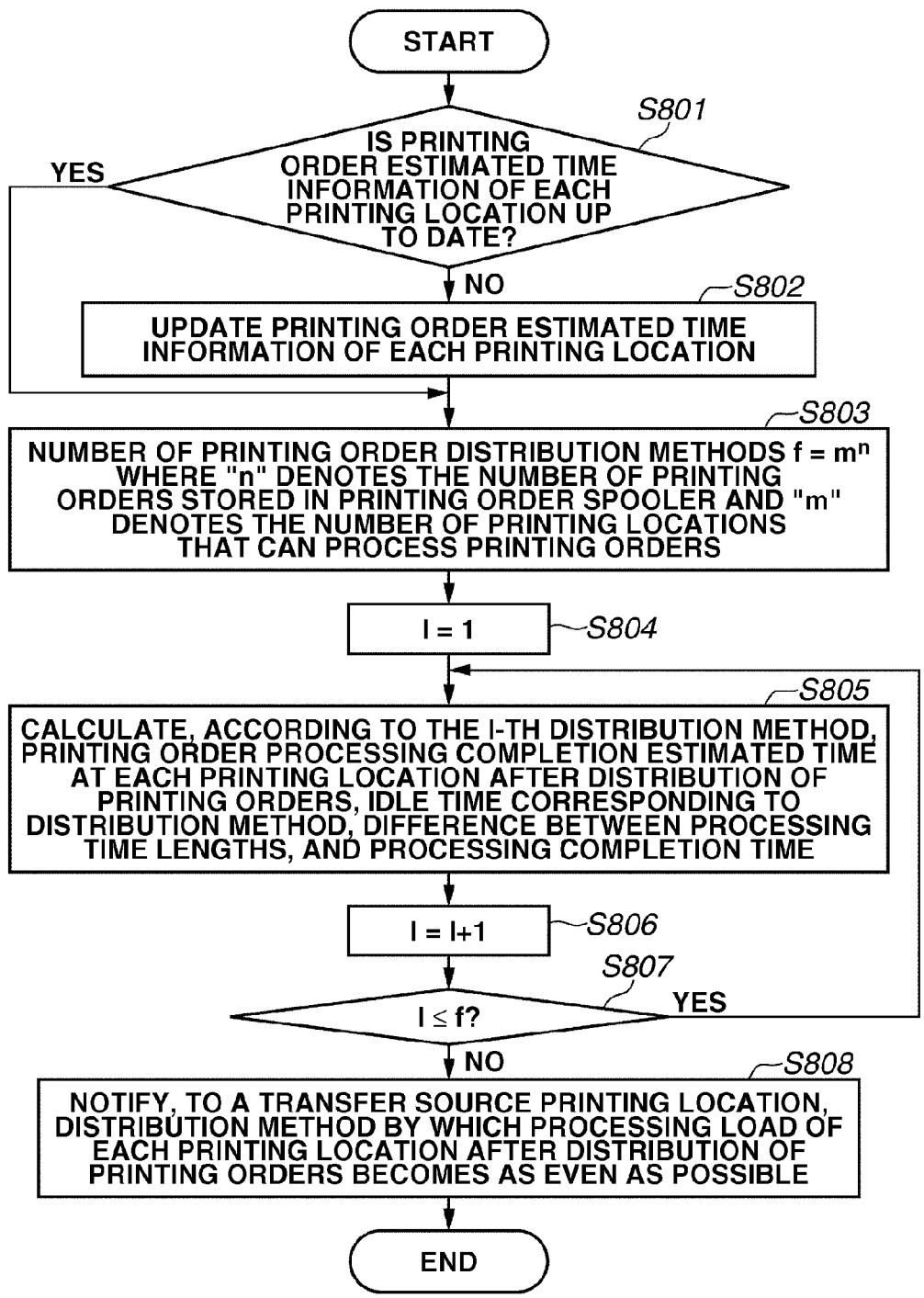

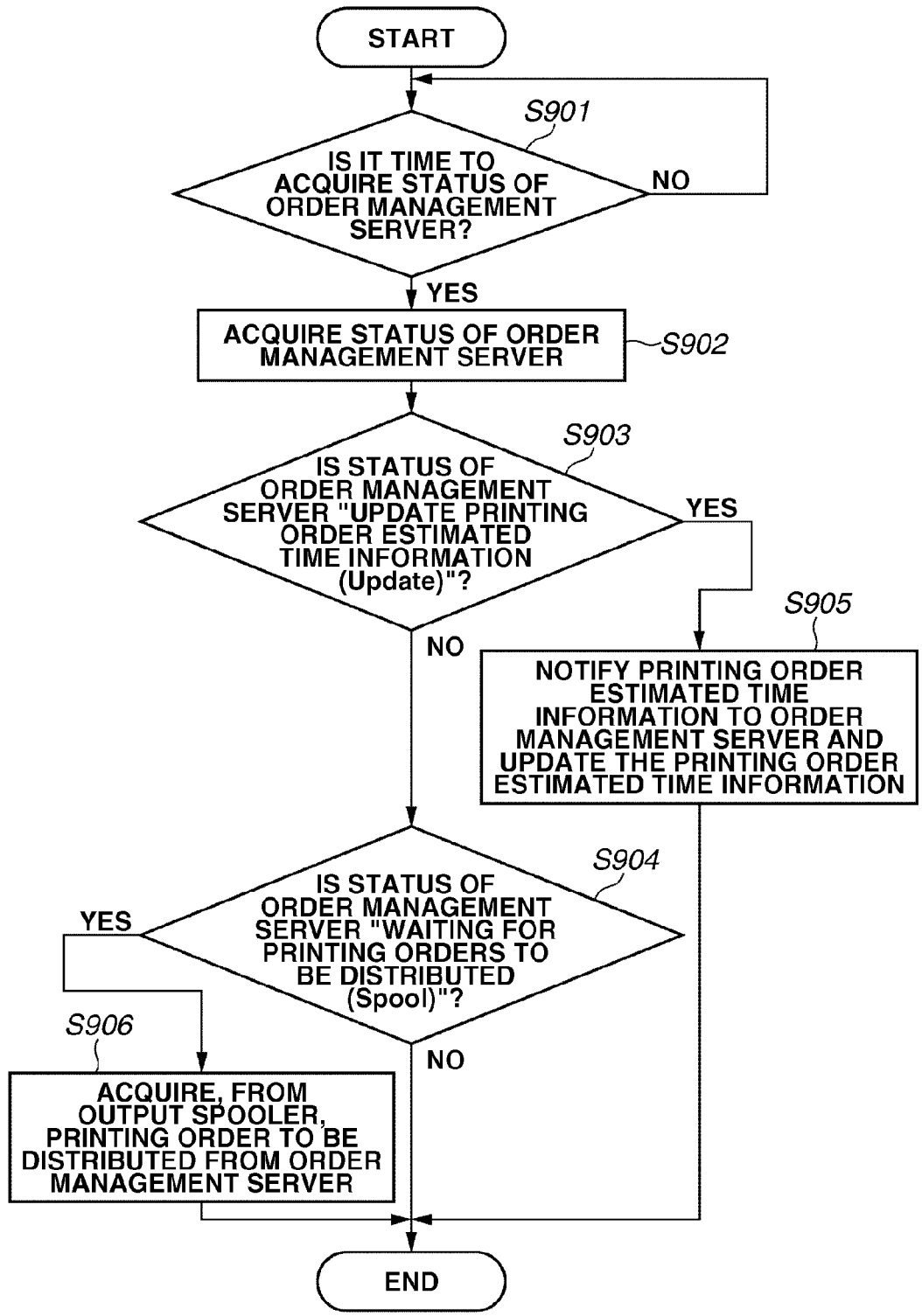

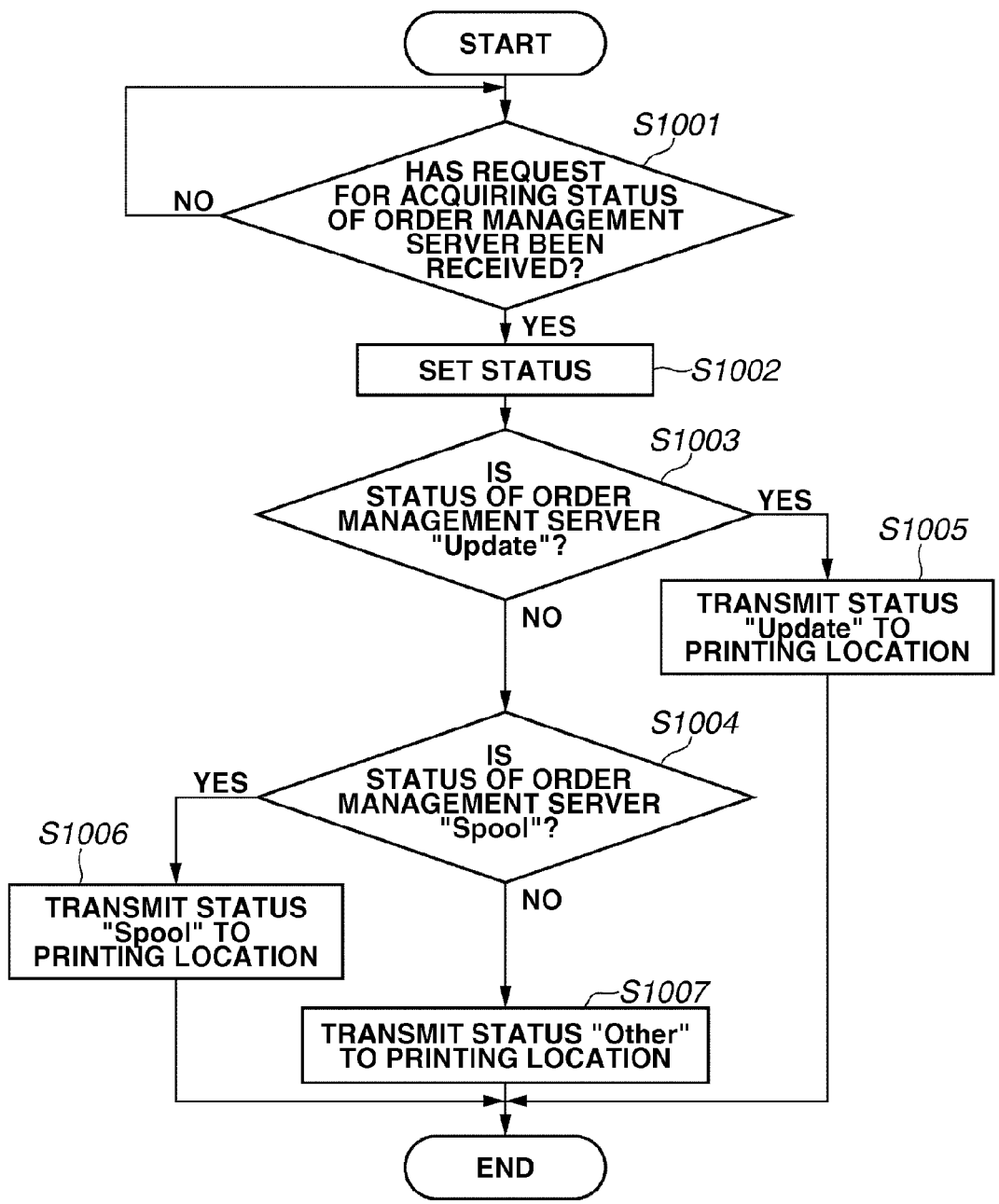

FIG.15

STORAGE MEDIUM SUCH AS FD/CD-ROM

| DIRECTORY INFORMATION |
|---|
| PROGRAM CODE CORRESPONDING TO STEPS IN FLOW CHART OF FIG. 3 |
| PROGRAM CODE CORRESPONDING TO STEPS IN FLOW CHART OF FIG. 7 |
| PROGRAM CODE CORRESPONDING TO STEPS IN FLOW CHART OF FIG. 8 |
| PROGRAM CODE CORRESPONDING TO STEPS IN FLOW CHART OF FIG. 12 |
| PROGRAM CODE CORRESPONDING TO STEPS IN FLOW CHART OF FIG. 13 |
| PROGRAM CODE CORRESPONDING TO STEPS IN FLOW CHART OF FIG. 14 |

DISTRIBUTED PRINTING SYSTEM, PRINT CONTROL METHOD FOR DETERMINING PRINTING OUTPUT LOCATIONS ACCORDING TO CONTENT AND ESTIMATED TIME INFORMATION, AND PROGRAM

BACKGROUND OF THE INVENTION

1. Field of the Invention

The present invention relates to a print control method executable in a printing system configured to execute printing by transferring printing orders received from order placement location apparatuses, each of which is connected to the printing system via a network, to a plurality of printing location apparatuses.

2. Description of the Related Art

With the recent widespread use of a digital camera and improvement of infrastructures of data communication via the Internet, a printing service has been widely used that utilizes a server on the Internet to receive photographic data (image data) and document data and to execute printing at printing apparatuses installed in various printing locations.

A print product of photographic data printed by a large-format inkjet printing apparatus or a print product of document data that is bound into a book is referred to as a "printing article", which corresponds to a printing order placement method having each printing style.

In addition, if each printing article and information about the printing article such as the number of printing orders thereof and a distribution destination thereof are processed as one piece of information, the printing article and the information including the above-described information are collectively referred to as a "printing order".

The above-described printing service includes a method intended for use in a small-scale photo store or a convenience store as a printing location, at which a user receives a print product. In addition, the above-described printing service includes a method in which print data is centrally printed by a printing apparatus installed at a plurality of large- or middle-scale printing locations, from which a print product is distributed to the user by a courier.

In the former method in which a user visits a printing location to receive a print product, it is desired that the print data is printed at a printing location as close as possible to a user's residence rather than to level out the load on printing apparatuses installed at each printing location. On the other hand, in the latter method in which print data is centrally printed, it is desired to increase the throughput of the entire system by leveling the load on printing apparatuses installed at each printing location as even as possible. More specifically, in order to most effectively execute printing by the above-described central printing method, it is useful to process all printing orders at one printing location.

However, if all printing orders are processed at one printing location in an actual case, the processing at the printing location may be hindered by power failure, an accident, or a natural disaster. In this case, the distribution of a print product may be delayed or the processing at the printing location may fail or be hindered. Accordingly, it is desired to spread the risk over a plurality of printing locations at mutually sufficiently distant places.

In structuring a system including a plurality of printing locations, it is necessary to distribute printing orders to different printing locations. Japanese Patent Application Laid-Open No. 2001-290627 discusses a method for distributing a printing order to a printing location whose load is small by considering the load on each printing location according to a result of detecting the load.

In addition, Japanese Patent Application Laid-Open No. 2005-31859 discusses a method for transferring a printing order from one printing location to another without applying a load to a server if a printing order has become unprocessible due to a printer failure after the printing orders are distributed.

The above-described conventional method for distributing printing orders considers the processing load of processing printing orders to be distributed. Accordingly, if any printing location has a throughput much higher than that of other printing locations, the printing orders may not be optimally distributed if the printing order distribution sequence does not agree with the throughput status of the printing locations.

Suppose that a printing order of a low processing load and another printing order of a high processing load are placed in this order to printing locations including a printing location A having a low throughput and a printing location B having a high throughput.

In the above-described conventional method, a printing order of a low processing load, which has been placed earlier than the other, is distributed to a printing location whose processing load is low at the time of placement of the printing order. In this case, because the printing locations A and B are not processing any printing order at this time, the loads of the printing locations A and B are considered to be the same load (i.e., "0"). Therefore, the low processing load-printing order is distributed to the printing location B having a high throughput, which is thus considered to be capable of processing the printing order faster than the printing location A.

When a printing order of a high processing load is placed after that, the high-processing load printing order is distributed to the printing location A because the printing location B has already been allocated with the low-processing load printing order. As a result of distributing the printing orders in the above-described manner, the high-processing load printing order is distributed to the printing location A having a low throughput. Accordingly, a great difference between the loads on the printing locations A and B may arise.

Moreover, in the above-described conventional method, if it is necessary to transfer a printing order that has been distributed to one printing location to another printing location because the printing at the printing order transferring source printing location has become disabled due to any failure or malfunction, the printing order is transferred to a previously fixedly set printing location. Accordingly, with the above-described conventional method, if the load on a printing order transferring destination printing location is high or if any failure has occurred when the printing order is transferred, the processing of the transferred printing order may be stagnated.

As described above, in a printing system including a plurality of printing locations, it is desired to execute the operation without an unbalanced operation rate among the printing apparatuses installed at the printing locations or an unbalanced load of processing by an operator.

SUMMARY OF THE INVENTION

The present invention is directed to a method for determining a printing location apparatus that processes a received printing order according to a printing order estimated time, which is notified from each printing location apparatus to level the loads of print processing executed by each printing apparatus, which is managed by each printing location apparatus.

According to an aspect of the present invention, a printing system includes an order management server and a plurality of printing location apparatuses. The order management server is configured to receive printing orders placed from a plurality of order placement location apparatuses via a network and to distribute the received printing orders to the plurality of printing location apparatuses via the network. In the printing system, each printing location apparatus includes a notification unit configured to notify a printing order estimated time, which is a time taken for completing processing of a printing order of each printing article that has been received from the order management server and is in a processing waiting state, to the order management server at a predetermined time interval. In addition, in the printing system, the order management server includes a storage unit configured to store a plurality of printing orders placed from the order placement location apparatuses, an updating unit configured to update printing order estimated time information according to each printing order estimated time notified from each printing location apparatus, a determination unit configured to determine a printing location apparatus or apparatuses to which to distribute the plurality of printing orders stored in the storage unit according to a content of each printing order placed from any of the order placement location apparatuses and the printing order estimated time information notified from the notification unit, and a transfer unit configured to transfer the printing orders stored in the storage unit to the printing location apparatus or apparatuses determined by the determination unit.

According to an exemplary embodiment of the present invention, loads of print processing executed by each printing location apparatus can be equalized by determining a printing location apparatus that processes a received printing order according to a printing order estimated time, which is notified by each printing location apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 3 is a flow chart illustrating exemplary data processing executed by an information processing apparatus according to an exemplary embodiment of the present invention.

FIG. 4A illustrates an example of a printing order estimated time information table, which is managed by an order management server illustrated in FIG. 1.

FIG. 4B illustrates an example of a printing order estimated time information table, which is managed by an order management server illustrated in FIG. 1.

FIG. 5A illustrates an example of a printing order information file processed by a host personal computer (PC) installed in an order placement location (FIG. 1) according to an exemplary embodiment of the present invention.

FIG. 5B illustrates an example of a printing order information file processed by a host personal computer (PC) installed in an order placement location (FIG. 1) according to an exemplary embodiment of the present invention.

FIGS. 6A and 6B illustrate an example of a printing order distribution table, which is generated by an order management server illustrated in FIG. 1, according to an exemplary embodiment of the present invention.

FIGS. 10A and 10B illustrate an example of printing order distribution processing executed in the printing system according to an exemplary embodiment of the present invention.

FIGS. 11A and 11B illustrate an example of an information table, which is managed by an order management server illustrated in FIG. 1, according to an exemplary embodiment of the present invention.

FIG. 12 is a flow chart illustrating exemplary data processing executed by an information processing apparatus according to an exemplary embodiment of the present invention.

FIG. 13 is a flow chart illustrating exemplary data processing executed by an information processing apparatus according to an exemplary embodiment of the present invention.

FIG. 14 is a flow chart illustrating exemplary data processing executed by an information processing apparatus according to an exemplary embodiment of the present invention.

FIG. 15 illustrates an example of a memory map of a storage medium storing various data processing programs that can be read by an information processing apparatus according to an exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
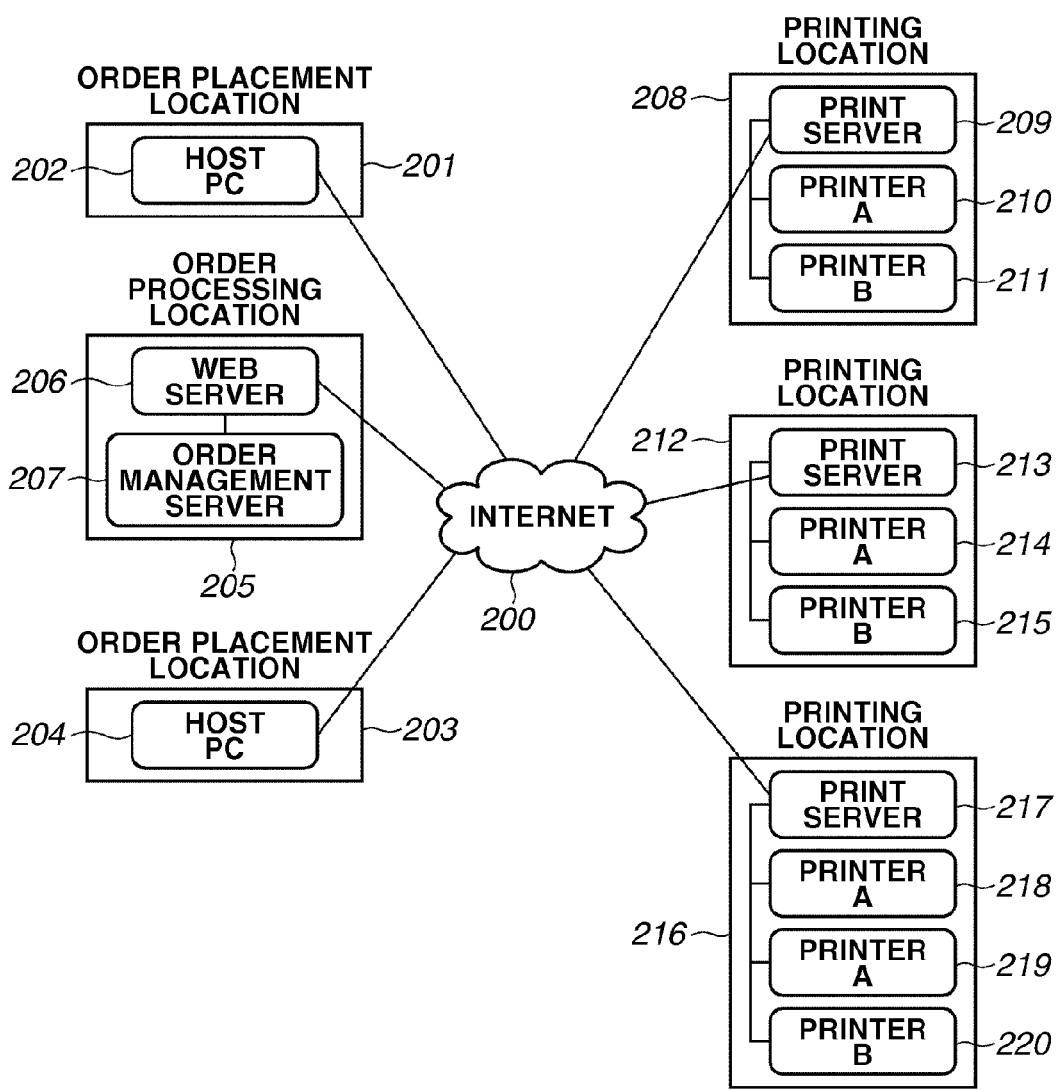
FIG. 1 illustrates an exemplary configuration of a printing system according to an exemplary embodiment of the present invention.

FIG. 1 illustrates an exemplary configuration of a printing system according to an exemplary embodiment of the present invention. In the present exemplary embodiment, the printing system includes a plurality of information processing apparatuses, which are installed at order placement locations, and a plurality of print servers, which are installed at printing locations. The information processing apparatuses and the print servers are in communication with one another via the Internet 200.

Moreover, print servers 209, 213, and 217, each of which corresponds to a printing location apparatus, are installed at printing locations. The print servers 209, 213, and 217 manage a plurality of printers. Furthermore, a printer A includes an electrophotographic printer engine. A printer B includes a printer engine that executes large-format print processing.

Furthermore, in the printing system according to the present exemplary embodiment, an order management server 207 receives printing orders placed from a plurality of host PCs 202 and 204 installed in order placement locations via a network. In addition, the order management server 207 distributes the received printing orders to a plurality of printing locations 208, 212, and 216.

The print servers 209, 213, and 217, which correspond respectively to the printing locations 208, 212, and 216, execute control of printing by the plurality of printers according to the printing orders distributed from the order management server 207. In the present exemplary embodiment, the Internet 200 is used as the network.

In the example illustrated in FIG. 1, the printing locations are mutually connected and in communication with one another via the Internet 200. Order placement locations 201 and 203 include host PCs 202 and 204, which correspond to order placement location apparatuses, respectively.

The host PCs 202 and 204, which are order placement location apparatuses, exist in the corresponding order placement locations 201 and 203, respectively. The host PCs 202 and 204 each can access a web server 206, which is installed at an order processing location 205, via the Internet 200, to place a printing order. The order processing location 205 is connected to the order placement locations 201 and 203 and the printing locations 208, 212, and 216 via the Internet 200. The web server 206 and the order management server 207 are installed in the order processing location 205.

The web server 206 receives a printing order from the order placement locations 201 and 203. The web server 206 distributes the received printing order to the printing location apparatus installed in the printing location 208, 212, or 216 via the Internet 200. A "printing location apparatus" corresponds to the print servers 209, 213, and 217.

The order management server 207 receives, via the web server 206, printing order information including print data transmitted from the order placement locations 201 and 203 via the Internet 200 and manages the received printing order information.

In addition, the order management server 207 receives printing order estimated time information from the printing location apparatus installed in the printing locations 208, 212, and 216. Furthermore, the order management server 207 updates a printing order estimated time information table with the received printing order estimated time information.

The "printing order estimated time information" refers to a printing order estimated time required for completing processing of a printing order of each printing article which has been received from the order management server 207 and is waiting to be processed. The printing order estimated time information is notified from the print servers 209, 213, and 217, each of which corresponds to a printing location apparatus.

The printing order estimated time increases or decreases according to the progress of print processing being executed at each printing location or according to the progress of processing of a newly received printing order.

In addition, when a new printing order is distributed or when a request for a transfer destination is issued from a printing location that cannot process a received printing order, the order management server 207 determines a distribution destination printing location or a transfer destination printing location. More specifically, the order management server 207 uses information stored in the printing order estimated time information table to determine a distribution destination printing location or a transfer destination printing location by a method, which will be described in detail below.

The print server (printing location apparatus) 209 and printers (printing apparatuses) 210 and 211 are installed in the printing location 208. The printer 210 functions as the printer A, while the printer 211 functions as the printer B.

Similarly, in the printing location 212, the print server 213 and the printers 214 and 215 are installed. The print server 217 and the printers 218, 219, and 220 are installed in the printing location 216. The printers 214, 218, and 219 each function as the printer A. The printers 215 and 220 each functions as the printer B.

The print servers 209, 213, and 217 are connected to the web server 206, which is installed in the order processing location 205, via the Internet 200. The print servers 209, 213, and 217 receive printing orders distributed from the order management server 207. In addition, the print servers 209, 213, and 217 notify printing order estimated time information to the order management server 207.

In addition, if a printer connected to the print server 209, 213, or 217 cannot execute printing due to any failure or malfunction, the print server 209, 213, or 217 acquires printing order transfer destination printing location information from the order management server 207.

Moreover, the print server 209, 213, or 217 transfers an unprocessed printing order via the Internet 200 according to the acquired transfer destination printing location information.

The type of the printers 210, 214, 218, and 219 is a type A, which is an electrophotographic type in the present exemplary embodiment. The type of the printers 211, 215, and 220 is a type B, which is a large-format inkjet printing type in the present exemplary embodiment.

Furthermore, in the present exemplary embodiment, the printing article that can be processed by the type A printer is different from the printing article that can be processed by the type B printer. The electrophotographic printer belonging to the type A is suitable to process a printing order of a large number of copies and pages but generally cannot output a large-size print product of A2 size or lager. On the other hand, the inkjet large-format printer belonging to the type B can print a printing article of the large size, such as posters, but is not suitable for processing a printing order of a large number of copies and pages because of an output speed lower than that of the type A printer.

In addition, printers of the same type may have different throughput levels due to difference in their engine configuration. Furthermore, the printers of the same type may print different printing articles according to the state of connection of optional apparatus. If a sheet post-processing apparatus can be connected to a printer as an optional apparatus, stapling or folding can be executed on the printing article.

As described above, both the type A and type B printers are installed in the printing locations 208, 212, and 216 of the printing system. With the above-described configuration, the printing system according to the present exemplary embodiment can appropriately print and process printing orders having different contents and information according to the types of the printing orders.

In addition, different from other printing locations, as twice as many type A printers, namely, two type A printers, are installed in the printing location 216 only. Accordingly, the printing article to be printed by the printer A can be processed in the printing location 216 in half the processing time of the time taken in other printing locations.

Figure 2:
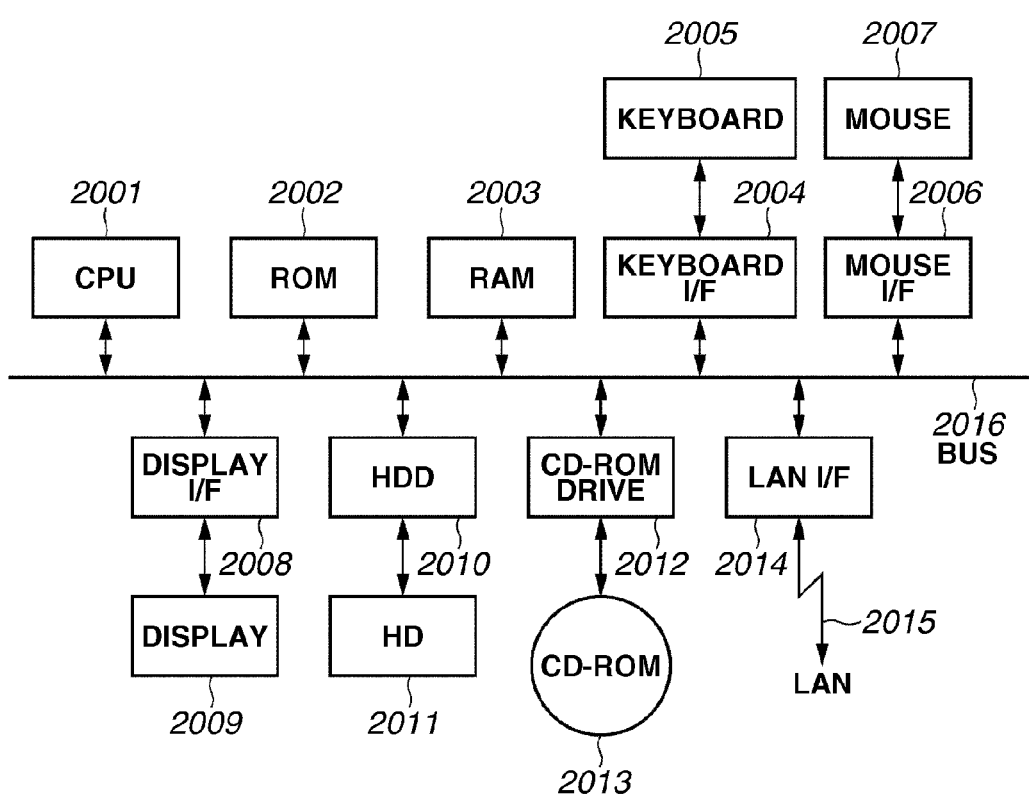
FIG. 2 is a block diagram illustrating an example of an information processing apparatus constituting the printing system illustrated in FIG. 1.

FIG. 2 is a block diagram illustrating an example of an information processing apparatus constituting the printing system illustrated in FIG. 1. A general-purpose PC can be used as the information processing apparatus according to the present exemplary embodiment.

Referring to FIG. 2, a central processing unit (CPU) 2001 executes calculation and logical determination for processing a printing order and executing printing. The CPU 2001 controls components of the information processing apparatus, which are connected to the CPU 2001 and in communication with one another via a bus 2016.

In addition, the CPU 2001 executes processing illustrated in each of the flow charts below according to a control program stored on a hard disk drive (HDD) 2010 and a read-only memory (ROM) 2002.

An address signal and a control signal for controlling each component of information processing apparatus with the CPU 2001 are transferred via the bus 2016. In addition, data is transmitted among the components via the bus 2016.

The ROM 2002 is a built-in read-only memory that stores a control program executed by the CPU 2001. A random access memory (RAM) 2003 is a rewritable random access memory configured to temporarily store various data transmitted from each component.

A keyboard 2005 and a mouse 2007 are connected to the bus 2016 via a keyboard interface (I/F) 2004 and a mouse I/F, which control reading of data, respectively. A user can input various data and instructions by operating the keyboard 2005 and the mouse 2007.

A display 2009 is constituted by a cathode ray tube (CRT) display or a liquid crystal display (LCD). Furthermore, the display 2009 is connected to the bus 2016 via a display I/F 2008. Various screens, such as a document search result display screen, are displayed on the display 2009.

The hard disk (HD) 2011 is connected to the bus 2016 via the HDD 2010, which controls reading and writing of data. The HD 2011 of the order management server 207 includes an area for storing a printing order placed from the host PCs 202 and 204 installed in the order placement locations 201 and 203 via the network (the Internet 200).

A compact disc-read only memory (CD-ROM) drive 2012 controls reading of data recorded on a CD-ROM 2013, which is a removable storage medium. The CD-ROM drive 2012 and the CD-ROM 2013 can be used at the same time as the HDD 2010 and the HD 2011.

A local area network (LAN) 2015 is used for data communication between the information processing apparatus and an external apparatus connected thereto via the network. The information processing apparatus is connected to the LAN 2015 via a LAN I/F 2014.

In the printing system according to the present exemplary embodiment having the above-described configuration, when the user executes an input operation by operating the keyboard 2005 or the mouse 2007, an interrupt signal is transmitted to the CPU 2001. Then, the CPU 2001 reads various control signals from the ROM 2002 to execute various control operations according to the read control signal.

The user of the printing service using the printing system according to the present exemplary embodiment accesses the web server 206 of the order processing location 205 from the order placement locations 201 and 203 via the Internet 200 to place a printing order from a web page for placing a printing order.

The placed printing order is transferred to the web server 206 of the order processing location 205 via the Internet 200. Then, the printing order is input to the order management server 207.

FIG. 3 is a flow chart illustrating exemplary data processing executed by the information processing apparatus according to the present exemplary embodiment. The data processing illustrated in FIG. 3 is an example of print control executed by the order management server 207 to distribute printing orders. Each step of the flow chart illustrated in FIG. 3 can be implemented with the CPU 2001 of the order management server 207 by loading and executing the control program stored on the ROM 2002 and the HD 2011 on the RAM 2003.

The HD 2011 or the RAM 2003 can store (spool) a plurality of printing orders received from the printing order placement location apparatus. A printing order includes the number of printing orders and information about a delivery destination of the printing article designated by the user who has placed the order in addition to print information, which is directly processed (printed) by the printer.

When the order management server 207 starts the processing, the present time is stored in printing order estimated time information start time and printing order reservation start time, which are managed on the RAM 2003. At the same time, the CPU 2001 resets printing order estimated time information updating time and printing order reservation time, which are managed on the RAM 2003, to "0".

Referring to FIG. 3, in step S101, the CPU 2001 of the order management server 207 determines whether it is the time for updating the printing order estimated time information. More specifically, the CPU 2001 executes the determination in step S101 according to a result of the determination as to whether time set for updating printing order estimated time information has exceeded a predetermined time (e.g., ten minutes).

If it is determined that the time set for updating printing order estimated time information has not exceeded a predetermined time (NO in step S101), then the processing advances to step S103. On the other hand, if it is determined that the time set for updating printing order estimated time information has exceeded a predetermined time (YES in step S101), then the processing advances to step S102.

In step S102, the CPU 2001 of the order management server 207 issues a request for updating the printing order estimated time information to each of the printing locations 208, 212 and 216 illustrated in FIG. 1 via the Internet 200. In the above-described manner, the CPU 2001 of the order management server 207 issues a request for updating printing order estimated time information to each of the printing locations 208, 212 and 216 at a predetermined time interval.

After receiving the request for updating the printing order estimated time information from the order management server 207, the CPU 2001 of each of the print servers 209, 213, and 217 respectively corresponding to the printing locations 208, 212, and 216 executes the following processing.

More specifically, the CPU 2001 of each of the print servers 209, 213, and 217 calculates a wait time (in the unit of minute(s)) of each printing article and time to be necessarily taken (in the unit of minute(s)) for processing one unit of each print article according to the current status of processing executed on the printer.

Furthermore, the CPU 2001 of each of the print servers 209, 213, and 217 transmits the calculated wait time of each printing article (mins) and time necessary for processing one unit of printing article (mins) to the order management server 207 as printing order estimated time information.

FIGS. 4A and 4B each illustrate an example of a printing order estimated time information table, which is managed by the order management server 207 illustrated in FIG. 1.

Referring to FIG. 4A, a printing order estimated time information table 400 is managed by the order management server 207. The wait time stored in the printing order estimated time information table 400, which is notified from each printing location, presents an estimated time to be taken for completing processing of each printing article currently being processed in each printing location at the time of notification thereof.

The total wait time including the wait time of all the printing articles is managed in a total wait time field of the printing order estimated time information table 400. In addition, a processing time field stores an estimated value of a processing time to be taken for processing one printing article in the printing locations 208, 212, and 216.

In the example illustrated in FIG. 4A, the processing time of the printing location 216 for processing each of printing articles A and B is a half of that of the printing locations 208 and 212. This is because the number of printers A, which process the printing articles A and B, is twice as many as that of the printing locations 208 and 212.

Each of the printing articles A and B is a printing article to be processed by the electrophotographic type printer A. The size of the printing article A is A4 while that of the printing article B is A3. Each of the printing articles C and D is a printing article to be processed by the inkjet large-format printer B. The size of the printing article C is A2 while that of the printing article D is A1.

When the printing order estimated time information is completely updated in the printing locations 208, 212, and 216 in step S102, the order management server 207 stores the current time (the time at which the printing order estimated time information is updated) in the printing order estimated time information start time and resets the printing order estimated time information updating time with an initial value "0".

In step S103, the CPU 2001 of the order management server 207 determines whether any printing order placed from the order placement locations 201 and 203 that has not been processed by the order management server 207 yet exists. If it is determined that no printing order placed from the order placement locations 201 and 203 that has not been processed by the order management server 207 yet exists (NO in step S103), then the processing advances to step S105. On the other hand, if it is determined that a printing order placed from the order placement locations 201 and 203 that has not been processed by the order management server 207 yet exists (YES in step S103), then the processing advances to step S104.

The user of the printing system places a printing order by inputting necessary information via a printing order placing web page, which is generated by the web server 206, of a web browser installed on the host PC 202 or 204 installed in the order placement location 201 or 203.

FIG. 5A illustrates an example of a printing order information file processed by the host PC 202 or 204 installed in the order placement location 201 or 203 (FIG. 1) according to the present exemplary embodiment. Referring to FIG. 5A, a printing order information file 300, which is described in a data format such as eXtended Markup Language (XML) format, includes a printing order identification (ID), a printing order placing person (customer) ID, a type of printing article, the number of printing articles, and a corresponding data file.

A printing order placing person is previously registered in the printing system as a customer. A printing order placing person is identified by a customer ID uniquely issued to the person. A resulting product of the printing article included in the placed printing order is delivered to an address of the customer, which is also registered in the printing system when the customer is registered. If a delivery destination address is particularly designated when the person places a printing order, a delivery destination item is added to the printing order information file 300. In this case, a resulting product of the printing article included in the placed printing order is delivered to the designated address.

The web server 206 receives the printing order information file 300 illustrated in FIG. 5A and portable document format (PDF) files including a file "data file manual0.5.pdf" and a file "poster0.1.pdf" from the host PC 202 or 204. After receiving the above-described files, the web server 206 transmits the files to the order management server 207.

The order management server 207 stores the received printing order information file 300 and data files in a printing order input buffer, which is managed by the RAM 2003, as files for an unprocessed printing order.

In step S104, the CPU 2001 of the order management server 207 adds, to a printing order spooling area, one unprocessed printing order whose reception time is the earliest of all the reception times of unprocessed printing orders that have been received and spooled in the printing order input buffer. Moreover, the CPU 2001 of the order management server 207 deletes the printing order added to the printing order spooling area from the printing order input buffer.

The printing order spooling area stores the printing order information file 300 and the data file of the printing order acquired from the printing order input buffer in an archive format (for example, the ZIP format). The printing order spooling area is secured on the HD 2011 of the order management server 207.

Moreover, the CPU 2001 of the order management server 207 manages information about each printing order in a printing order management table on the RAM 2003 as illustrated in FIG. 5B. FIG. 5B illustrates an example of a printing order management table 301 managed by the order management server 207 (FIG. 1) according to the present exemplary embodiment.

Referring to FIG. 5B, a printing order ID field of the printing order management table 301 stores a value of an ID attribute of a printing order item included in the printing order information file 300. The customer ID is an ID item of customer items.

A data file item of the printing order management table 301 stores a file name of a file of the archive format stored in the printing order spooling area of the printing the order management server 207.

Item fields "number of printing articles A", "number of printing articles B", "number of printing articles C", and "number of printing articles D" respectively stores information about the number of each corresponding type of printing article, which is designated and described in the printing order.

In the present exemplary embodiment, two printing order information files of a printing order whose printing order ID is "1" are designated for a printing order type A (a printing article A). In addition, one printing order information file of a printing order whose printing order ID is "1" is designated for a printing order type C (a printing article C).

On the other hand, no ("0") printing order information file of a printing order whose printing order ID is "1" is designated for a printing order type B (a printing article B) and a printing order type D (a printing article D). After adding the printing order to the printing order spooling area, then the processing advances to step S105.

In step S105, the CPU 2001 of the order management server 207 determines whether it is the time for distributing the printing orders. If it is determined that it is the time for distributing the printing orders (YES in step S105), then the processing advances to step S107. On the other hand, if it is determined that it is not the time for distributing the printing orders (NO in step S105), then the processing advances to step S106. The processing for determining whether it is the time for distributing the printing orders will be described in detail below.

In step S106, the CPU 2001 of the order management server 207 updates the printing order estimated time information update time and the printing order reservation time. Then, the processing advances to step S101.

The printing order estimated time information update time is updated by setting the difference between the present time and the printing order estimated time information start time as the printing order estimated time information update time. The printing order reservation time is updated by setting the difference between the present time and the printing order reservation start time as the printing order reservation time.

Now, the printing order distribution processing in step S107 and beyond will be described in detail below.

In step S107, the order management server 207 calculates an estimated value of the time taken for processing at each printing location by referring to the printing order estimated time information table 400 (FIG. 4A), as indicated with a printing order estimated time information table 401 (FIG. 4B).

More specifically, the CPU 2001 of the order management server 207 calculates an estimated value of the processing time of the printing order spooled in the printing order spooling area at each printing location in the following manner.

The CPU 2001 of the order management server 207 sets a value "mn" as a variable f, which denotes the number of printing order distribution methods. The term "n" of the value "mn" denotes the number of printing orders being spooled in the printing order spooling area. The term "m" denotes the number of printing locations.

After calculating the variable f, the CPU 2001 of the order management server 207 generates a printing order distribution table illustrated in FIGS. 6A and 6B on the RAM 2003. The printing order distribution table includes information about the distribution methods for distributing printing orders. Then, the processing advances to step S108.

However, if the number n of printing orders currently spooled in the printing order spooling area is "0", the CPU 2001 of the order management server 207 does not generate a printing order distribution table. In the present exemplary embodiment, the variable "f" denotes the number of combinations of the printing order distribution methods.

FIGS. 6A and 6B illustrate an example of a printing order distribution table 500, which is generated by the order management server 207 (FIG. 1) according to the present exemplary embodiment. The printing order distribution table 500 illustrated in FIGS. 6A and 6B is generated by calculating the processing time of each combination of printing order distribution methods.

In step S108, the CPU 2001 of the order management server 207 determines whether the number of printing orders n spooled in the printing order spooling area is "0". If it is determined that the number of printing orders n spooled in the printing order spooling area is "0" (YES in step S108), then the processing ends.

On the other hand, if it is determined that the number of printing orders n spooled in the printing order spooling area is not "0" (NO in step S108), then the processing advances to step S109.

In step S109, the CPU 2001 of the order management server 207 sets a value "1" to a variable I. The variable I is a parameter value used for designating the combination number in the printing order distribution table 500 with respect to each printing order distribution method combination illustrated in FIGS. 6A and 6B. Then, the processing advances to step S110.

In step S110, the CPU 2001 of the order management server 207 refers to printing order estimated time information about each printing order distribution destination printing location of each printing order, which is stored in a field of a row, in the printing order distribution table 500 (FIGS. 6A and 6B), corresponding to the combination number for each printing order distribution method combination designated with the variable I.

Then, the CPU 2001 of the order management server 207 refers to the printing order estimated time information for the distribution destination printing location of each printing order to calculate the printing completion estimated time of all printing orders of each printing location after the printing orders are distributed.

After completing the calculation of the printing completion estimated time of each of the printing locations 208, 212, and 216, the CPU 2001 of the order management server 207 calculates a value of an idle time, a difference between processing time lengths, and a processing completion time in the printing order distribution table 500.

A maximum value of the printing order processing completion estimated time after the printing orders are distributed is stored in the processing completion time field of the printing order distribution table 500 illustrated in FIGS. 6A and 6B. In addition, the "difference between processing time lengths" field stores a value of the difference between a minimum value and a maximum value of the printing order processing completion estimated time after the printing orders are distributed.

Furthermore, the CPU 2001 calculates a value of the idle time with respect to all printing locations by subtracting the value of the printing order processing completion estimated time after the printing orders are distributed for each printing location from the processing completion time with respect to all printing locations. The value of the idle time denotes the length of the time in which the processing at each printing location is not executed during the time period from the start of the processing by the entire printing system to the completion thereof.

After completing the above-described calculation, the processing advances to step S111.

In step S111, the CPU 2001 of the order management server 207 increments the variable I by 1. Then, the processing advances to step S112. In step S112, the CPU 2001 of the order management server 207 determines whether the variable I is equal to or smaller than the variable f.

If it is determined that the variable I is equal to or smaller than the variable f (YES in step S112), then the processing advances to step S110. On the other hand, if it is determined that the variable I is greater than the variable f (NO in step S112), then the processing advances to step S113.

In the determination processing in step S113, the CPU 2001 of the order management server 207 transfers the printing orders to the printing location apparatus (print server) installed in each of the printing locations 208, 212 and 216 according to a distribution method, among the distribution methods stored in the printing order distribution table 500 with respect to each printing order distribution method combination illustrated in FIGS. 6A and 6B, with which the processing loads of the printing orders after the printing orders are distributed becomes as even as possible. Then, the processing ends.

Figure 7:
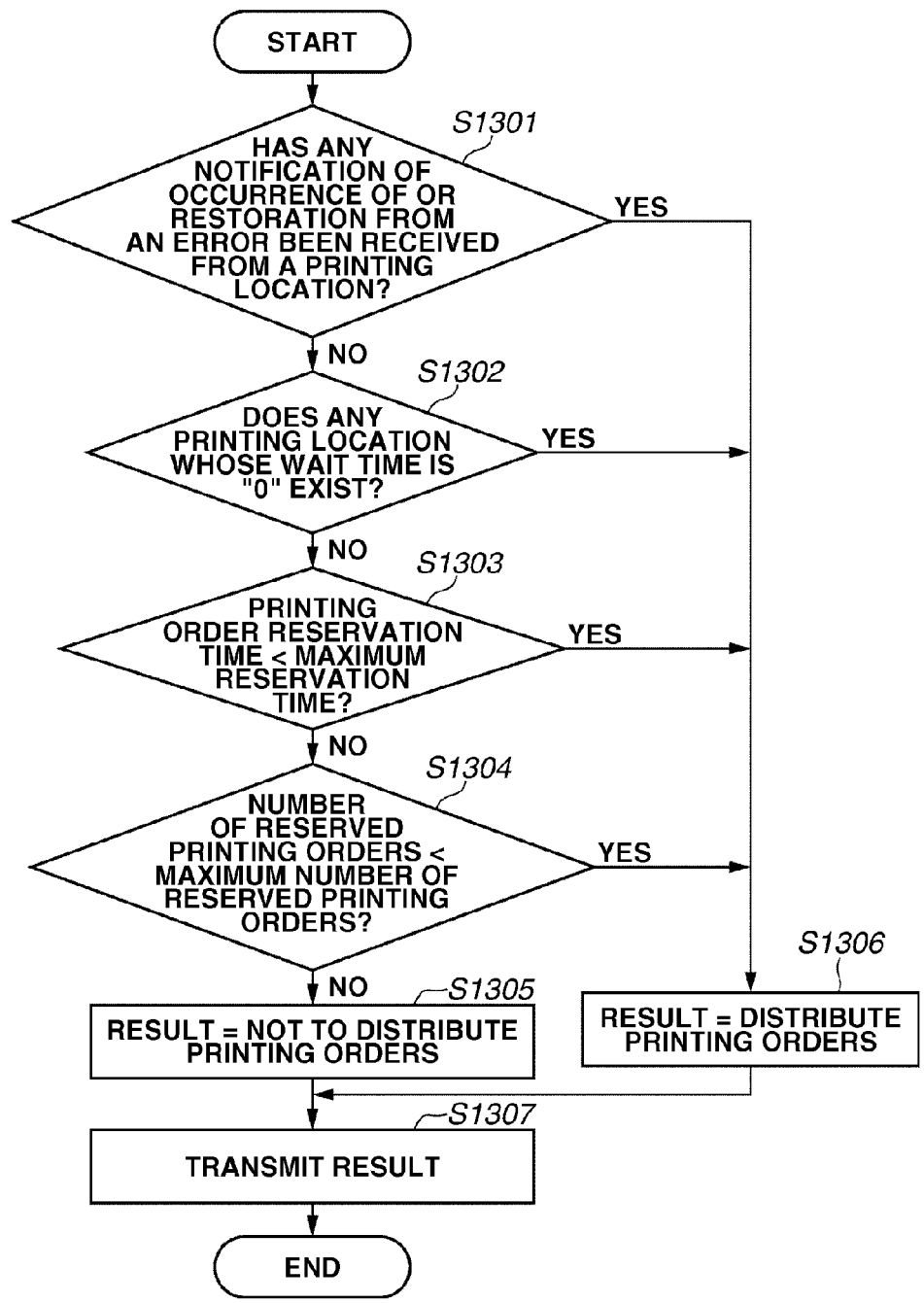
FIG. 7 is a flow chart illustrating exemplary data processing executed by an information processing apparatus according to an exemplary embodiment of the present invention.

FIG. 7 is a flow chart illustrating exemplary data processing executed by the information processing apparatus according to the present exemplary embodiment. The processing illustrated in FIG. 7 is an example of print control executed in step S105 (FIG. 3) by the order management server 207 for determining the printing order distribution start time.

Each step of the flow chart illustrated in FIG. 7 can be implemented with the CPU 2001 of the order management server 207 by loading and executing the control program stored on the ROM 2002 and the HD 2011 on the RAM 2003.

When the order management server 207 starts the determination of the printing order distribution start time, in step S1301, the CPU 2001 of the order management server 207 determines whether a notification indicating that an error has occurred or the error has been solved has been received from any printing location.

If it is determined that a notification indicating that an error has occurred or the error has been solved has been received from any printing location (YES in step S1301), then the processing advances to step S1306. On the other hand, if it is determined that a notification indicating that an error has occurred or the error has been solved has not been received from any printing location (NO in step S1301), then the processing advances to step S1302. If it is determined that a notification indicating that an error has occurred or the error has been solved has been received from any printing location, it becomes necessary to re-distribute the printing orders.

In step S1302, the CPU 2001 of the order management server 207 determines whether any printing location whose total wait time is "0" exists according to the printing order estimated time information of each printing location, which is updated in step S102 (FIG. 3).

If it is determined that a printing location whose total wait time is "0" exists (YES in step S1302), then the processing advances to step S1306. On the other hand, if it is determined that no printing location whose total wait time is "0" exists (NO in step S1302), then the processing advances to step S1303.

By distributing the printing orders to a printing location whose total wait time is "0" in the above-described manner, the present exemplary embodiment can reduce the idle time.

In step S1303, the CPU 2001 of the order management server 207 determines whether the printing order reservation time exceeds a predetermined maximum reservation time (20 minutes, for example). If it is determined that the printing order reservation time exceeds the predetermined maximum reservation time (YES in step S1303), then the processing advances to step S1306. On the other hand, if it is determined that the printing order reservation time does not exceed the predetermined maximum reservation time (NO in step S1303), then the processing advances to step S1304.

In step S1304, the CPU 2001 of the order management server 207 determines whether the number of printing orders reserved in the printing order spooling area exceeds a predetermined maximum number of reserved printing orders (e.g., "6").

If it is determined that the number of printing orders reserved in the printing order spooling area exceeds the predetermined maximum number of reserved printing orders (YES in step S1304), then the processing advances to step S1306. On the other hand, if it is determined that the number of printing orders reserved in the printing order spooling area does not exceed the predetermined maximum number of reserved printing orders (NO in step S1304), then the processing advances to step S1305.

In step S1305, the CPU 2001 of the order management server 207 sets "Not to Distribute" as the determination result. Then, the processing advances to step S1307.

On the other hand, in step S1306, the CPU 2001 of the order management server 207 sets "Execute Distribution" as the determination result. Then, the processing advances to step S1307.

In step S1307, the CPU of the order management server 207 transmits the determination result as the result of determination in step S105 (FIG. 3). Then, the processing illustrated in FIG. 7 ends.

Figure 8:
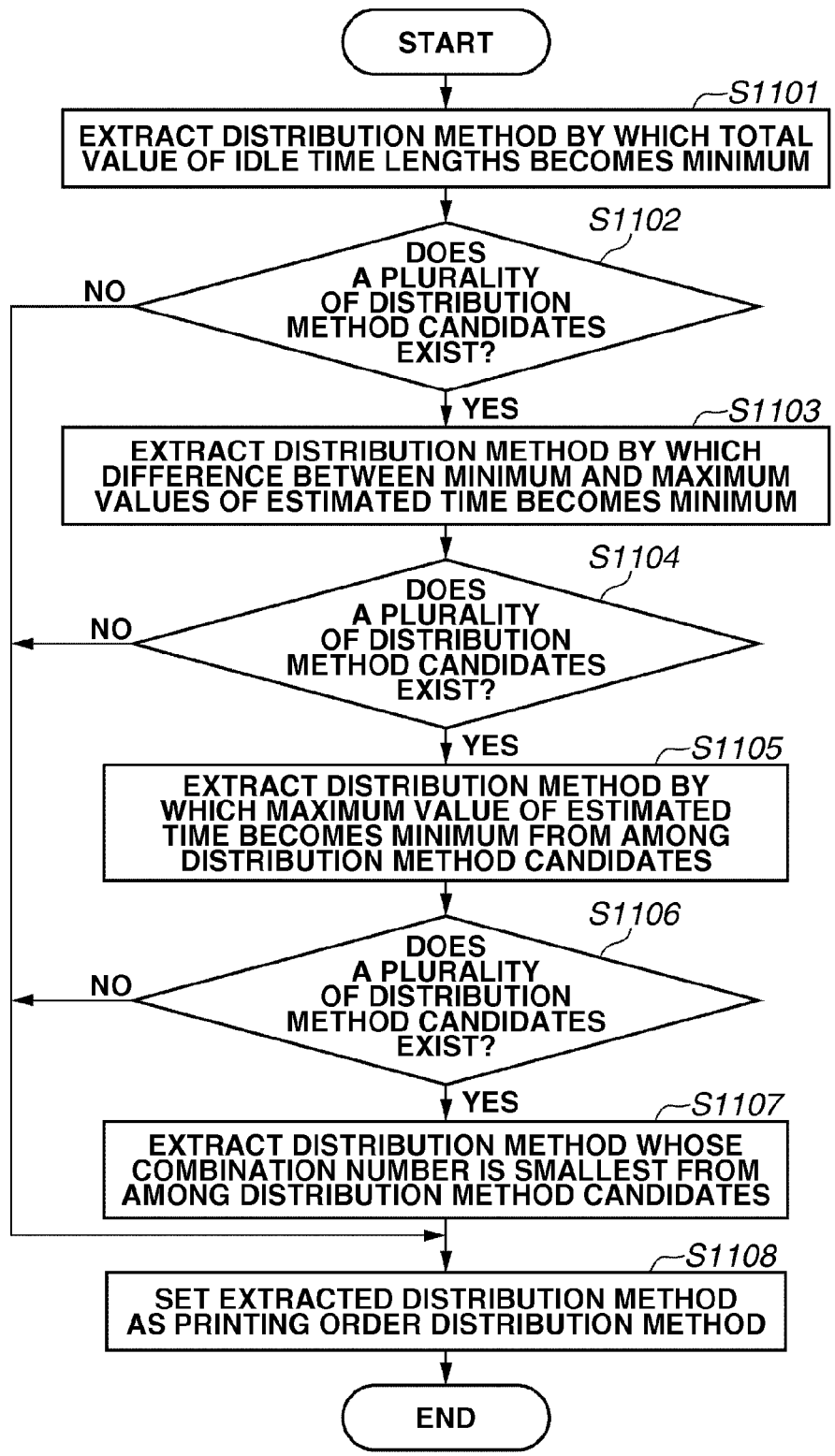
FIG. 8 is a flow chart illustrating exemplary data processing executed by an information processing apparatus according to an exemplary embodiment of the present invention.

FIG. 8 is a flow chart illustrating exemplary data processing executed by the information processing apparatus according to the present exemplary embodiment. The processing illustrated in FIG. 8 is an example of print control for selecting a combination of printing order distribution methods.

Each step of the flow chart illustrated in FIG. 8 can be implemented with the CPU 2001 of the order management server 207 by loading and executing the control program stored on the ROM 2002 and the HD 2011 on the RAM 2003.

When the order management server 207 starts the processing for selecting the combination of printing order distribution methods, the CPU 2001 of the order management server 207 refers to the value stored in the printing order distribution table 500 for each combination of printing order distribution methods (FIGS. 6A and 6B) to execute the following processing.

Referring to FIG. 8, in step S1101, the CPU 2001 of the order management server 207 extracts a combination whose value in the idle time field of the printing order distribution table 500 for each combination of printing order distribution methods is the smallest of all the idle time values. Then, the processing advances to step S1102.

The combination whose value in the idle time field of the printing order distribution table 500 for each combination of printing order distribution methods is the smallest of all the idle time values corresponds to the combination numbers "6" and "12", which are shown in shaded fields in FIG. 6A.

In step S1102, the CPU 2001 of the order management server 207 determines whether a plurality of combinations of the printing order distribution methods extracted in step S1101 exists. If it is determined that only one combination of the printing order distribution methods extracted in step S1101 only exists (NO in step S1102), then the processing advances to step S1108. On the other hand, if it is determined that a plurality of combinations of the printing order distribution methods extracted in step S1101 exists (YES in step S1102), then the processing advances to step S1103.

In step S1103, the CPU 2001 of the order management server 207 extracts a combination whose value in the difference between the processing time lengths is the smallest of all the processing time length values with respect to each printing order distribution method combination extracted in step S1101. Then, the processing advances to step S1104.

In step S1104, the CPU 2001 of the order management server 207 determines whether a plurality of combinations of printing order distribution methods extracted in step S1103 exists. If it is determined that only one printing order distribution method exists (NO in step S1104), then the processing advances to step S1108. On the other hand, if it is determined that a plurality of combinations of printing order distribution methods extracted in step S1103 exists (YES in step S1104), then the processing advances to step S1105.

In step S1105, the CPU 2001 of the order management server 207 extracts a combination whose value of the processing completion time field is the smallest of all the values of the processing completion time of the combinations of the printing order distribution methods extracted in step S1103. Then, the processing advances to step S1106.

In step S1106, the CPU 2001 of the order management server 207 determines whether a plurality of combinations of the printing order distribution methods extracted in step S1105 exists. If it is determined that only one printing order distribution method exists (NO in step S1106), then the processing advances to step S1108. On the other hand, if it is determined that a plurality of combinations of printing order distribution methods extracted in step S1103 exists (YES in step S1106), then the processing advances to step S1107.

In step S1107, the CPU 2001 of the order management server 207 extracts a printing order distribution method whose combination number stored in the printing order distribution table 500 for each printing order distribution method combination is the smallest of all the combination numbers of the printing order distribution methods extracted in step S1105. Then, the processing advances to step S1108.

In step S1108, the CPU 2001 of the order management server 207 sets the distribution method extracted in the above-described manner as the printing order distribution method. Then, the processing ends.

In the present exemplary embodiment, two combinations whose idle time is the smallest (70 minutes) of all the idle time values, namely, the combination numbers "6" and "12", exist as illustrated in FIGS. 6A and 6B.

The difference between the processing time lengths of the combination number "6" is 40 minutes while that of the combination number "12" is 50 minutes. Therefore, the value of the difference between the processing time lengths of the combination number "6" is the smaller of the two. Accordingly, the CPU 2001 of the order management server 207 selects the combination number "6" in step S1107.

By executing the above-described processing, printing orders 1, 2, and 3 are distributed to the printing locations 208, 212, and 216, respectively.

When the printing orders are completely transferred to the printing locations, the printing order distribution processing illustrated in FIG. 3 ends. If the order management server 207 does not end the processing, the CPU 2001 of the order management server 207 returns to step S100 illustrated in FIG. 3 to start a new printing order distribution processing flow.

Now, the difference between conventional data processing and the data processing according to the present exemplary embodiment will be described in detail below with reference to tables illustrated in FIGS. 9 and 10.

Figure 9:
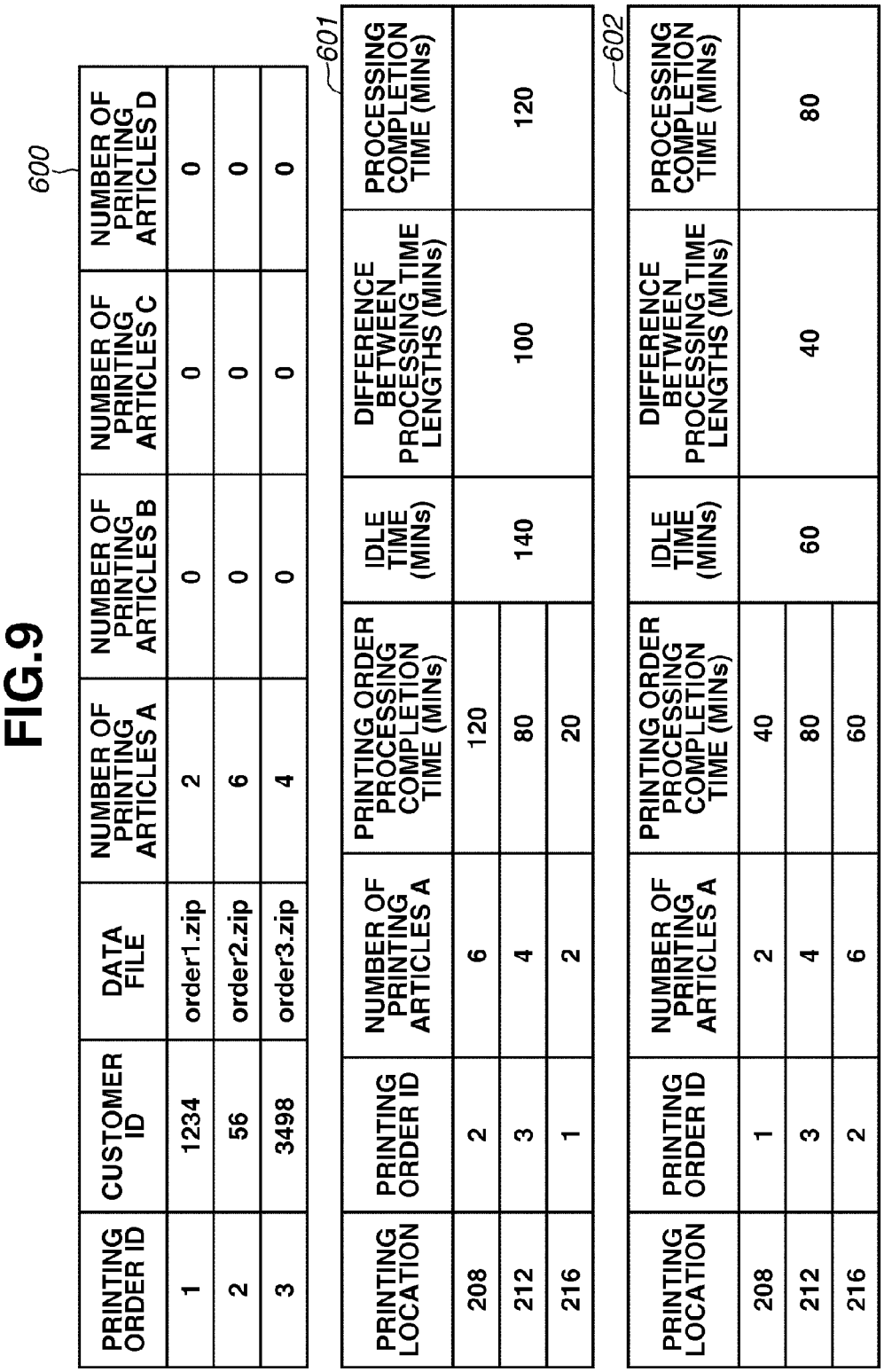
FIG. 9 illustrates an example of printing order distribution processing executed in a conventional printing system.

FIG. 9 illustrates printing order distribution processing executed in a conventional printing system. For easier understanding, it is supposed here that the printing order includes a printing article A only. In this case, the processing time lengths for the printing article A of the printing locations 208, 212, and 216 are 20 minutes, 20 minutes, and 10 minutes, respectively, as is known from the printing order estimated time information table 400 illustrated in FIG. 4.

As is known from a table 600 illustrated in FIG. 9, it is supposed here that printing orders of printing order IDs 1, 2, and 3, which include two, six, and four printing articles A, respectively, are placed. It is also supposed here that no unprocessed printing order exists in each of the printing locations 208, 212, and 216 when the printing orders are distributed.

FIGS. 10A and 10B illustrate exemplary printing order distribution processing executed in the printing system according to the present exemplary embodiment.

Now, the difference between the conventional method and the present exemplary embodiment will be described in detail below with reference to tables 600 through 602 (FIG. 9) and a processing time calculation table 1200 (FIGS. 10A and 10B).

To begin with, the printing order processing completion time, the idle time, the difference between the processing time lengths, and the processing completion time for each printing location when the printing orders are distributed by the conventional method and the present exemplary embodiment, which are stored in the tables 601 and 602 (FIG. 9), will be described in detail below.

The conventional method does not spool the printing orders. More specifically, the conventional method selects a printing location in which a printing order can be output as soon as possible according to the status of processing and the status of load of each printing location at the time of receipt of the printing order on the order management server 207 and distributes the printing order to the selected printing location.

In the example illustrated in FIG. 9, no unprocessed printing order exists in each printing location and the printing location 216 has the highest throughput of all the printing locations. Accordingly, the first printing order having a printing order ID "1" is distributed to the printing location 216.

When the second printing order having a printing order ID "2" is received, the printing order of the printing order ID "1" has already been distributed to the printing location 216. Therefore, the second printing order of the printing order "2" is distributed to the other printing location 208 or 212.

No unprocessed printing order exists in the printing locations 208 and 212. In addition, the printing locations 208 and 212 have the same level of throughput. Accordingly, the second printing order of the printing order "2" is distributed to the printing location 208.

The first and the second printing orders have already been distributed to the printing location 208 and the printing location 216, respectively, when the third printing order having a printing order ID "3" is received. Therefore, the third printing order having a printing order ID "3" is distributed to the printing location 212, in which no unprocessed printing order exists.

If the printing orders in the example illustrated in FIG. 9 are distributed by the conventional method as illustrated in the table 601 (FIG. 9), the idle time, the difference between the processing time lengths, and the processing completion time are 140 minutes, 100 minutes, and 120 minutes, respectively. On the other hand, in the method according to the present exemplary embodiment, the CPU 2001 of the order management server 207 starts the distribution of printing orders when all of the printing orders of the printing order IDs 1, 2, and 3 are spooled in the printing order spooling area of the order management server 207.

FIGS. 10A and 10B illustrate an example of the processing time calculation table 1200 for each printing order distribution method combination managed by the information processing apparatus according to the present exemplary embodiment. The processing time calculation table 1200 is equivalent to the printing order distribution table 500 for each printing order distribution method combination illustrated in FIGS. 6A and 6B.

In the processing time calculation table 1200 illustrated in FIGS. 10A and 10B, the combination numbers 8 and 16 have the same idle time, difference between the processing time lengths, and processing completion time. Accordingly, the combination number 8, which is the smaller of the two, is selected in step S1107 (FIG. 8).

In addition, a table 602 (FIG. 9) is generated when the printing orders having the printing order IDs 1, 2, and 3 are distributed to the printing locations 208, 212, and 216, respectively, based on the combination of the combination number "8" according to the present exemplary embodiment.

Referring to the tables 601 and 602 illustrated in FIG. 9, in processing the printing orders of printing order IDs 1, 2, and 3, all of the idle time, the difference between the processing time lengths, and the processing completion time in the table 602 according to the present exemplary embodiment are smaller than those of the conventional method. Accordingly, the present exemplary embodiment is useful in leveling the processing loads and effectively executing the processing.

In the conventional method, if the printing order having the printing order ID 2 is distributed to the printing location 216 and the printing order having the printing order 3 is distributed to the printing location 208 or the printing location 212 considering that the throughput of the printing location 216 is high, the processing completion time is 80 minutes, which is the same as that of the present exemplary embodiment. However, in this case, the idle time is 160 minutes and the difference between the processing time lengths is 80 minutes, both of which are greater than those of the present exemplary embodiment.

The present exemplary embodiment executes the above-described printing order distribution method. Accordingly, the present exemplary embodiment can execute the distribution of the printing orders more effectively than the distribution by the conventional method by considering the throughput of each printing location, the status of processing in each printing location, and the processing load of a plurality of printing orders spooled on the order management server 207.

With the above-described configuration, the present exemplary embodiment can reduce the time taken for completing the processing executed in the entire printing system and reduce the difference between the processing time lengths among apparatuses installed in the printing locations by acquiring the status of processing of printing orders distributed and allocated to the printing apparatuses installed in the printing locations of the printing system and transferring a printing order to be processed next to an appropriate printing location apparatus.

Now, processing will be described in detail below that is executed if a printing order cannot be processed due to a failure in the printing system and if the processing of the printing order received from the order management server 207 cannot be continued due to the failure.

In this case, in the present exemplary embodiment, a print server corresponding to a printing location apparatus that manages the printer on which the failure has occurred issues a request, to the order management server 207, for transmitting information about an available printing order transfer destination of each printing order.

In response to the request from each print server, the order management server 207 notifies an available printing order transfer destination to the request source print server. Then, the printing location apparatus on which the failure has occurred transfers the unprocessed printing order to the print server that is a printing location apparatus available as a printing apparatus currently capable of processing the unprocessed printing order and notified from the order management server 207.

The printing system according to the present exemplary embodiment has the system configuration illustrated in FIG. 1 and includes hardware resources illustrated in FIG. 2. It is supposed here that the printing orders that are targets of distribution by the order management server 207 have already been distributed and currently being processed.

In this case, if the processing of the printing order cannot be continued due to a failure such as a failure occurring on a printer in the printing location 208 during processing of the printing order, then the print server inquires a printing order transfer destination of the order management server 207.

FIG. 11A illustrates an example of a table 700, which stores information about unprocessed printing orders existing in the printing location 208 when the printing orders cannot be processed therein as a list.

The print server 209 installed in the printing location 208 notifies the printing order information stored in the table 700 (FIGS. 11A and 11B) to the order management server 207. In addition, the print server 209 issues a request for determining a printing order transfer destination printing location to the order management server 207.

FIG. 12 is a flow chart illustrating exemplary data processing executed by the information processing apparatus according to the present exemplary embodiment. The processing illustrated in FIG. 12 is an example of print control executed by the order management server 207 if a request for determining a printing order transfer destination is issued from a printing location.

Each step of the flow chart illustrated in FIG. 12 can be implemented with the CPU 2001 of the order management server 207 by loading and executing the control program stored on the ROM 2002 and the HD 2011 on the RAM 2003.

The processing illustrated in FIG. 12 starts when the order management server 207 receives a printing order transfer destination determination request from each of the printing locations 208, 212, and 216.

Referring to FIG. 12, in step S801, the CPU 2001 of the order management server 207 determines whether the printing order estimated time information of each of the printing locations 208, 212 and 216, which is managed by the order management server 207, has been up to date. More specifically, in the present exemplary embodiment, the CPU 2001 of the order management server 207 determines whether an elapsed time from the time of last update of printing order estimated time information to the present time is greater than a predetermined time length (ten minutes, for example).

If it is determined that the elapsed time from the time of last update of printing order estimated time information to the present time is equal to or smaller than the predetermined time length (NO in step S801), then the processing advances to step S803. On the other hand, if it is determined that the elapsed time from the time of last update of printing order estimated time information to the present time is greater than the predetermined time length (YES in step S801), then the processing advances to step S802.

In step S802, the CPU 2001 of the order management server 207 issues a request for updating the printing order estimated time information to each of the printing locations 208, 212 and 216. More specifically, in step S802, the order management server 207 issues a request for updating the printing order estimated time information to the printing order transfer destination determination request source printing location and to all of the printing locations except the printing location whose processing is currently hindered by the failure.

A printing order estimated time information table 701 (FIG. 11A) stores updated printing order estimated time information of each printing location. The printing location 208, which is the printing order transfer destination determination request source printing location, is not included in the printing order estimated time information table 701.

In step S803 (FIG. 12), the CPU 2001 of the order management server 207 calculates an estimated value of the processing time if each printing order spooled in the printing order spooling area is processed in each printing location according to the printing order estimated time information table 701 (FIG. 11A).

A table 702 illustrated in FIG. 11A stores a result of calculation of the estimated value executed by the CPU 2001 of the order management server 207.

In step S803, the CPU 2001 of the order management server 207 sets a value "mn" as a variable f, which denotes the number of printing order distribution methods. The term "n" of the value "mn" denotes the number of printing orders being spooled in the printing order spooling area. The term "m" denotes the number of printing locations that can currently process printing orders.

After calculating the variable f, the CPU 2001 of the order management server 207 generates a printing order distribution table, which includes information about the distribution methods for distributing printing orders. Then, the processing advances to step S804.

The number of printing locations that can process printing orders ("m") refers to the number of printing locations calculated by subtracting the number of printing locations whose processing is currently suspended and the printing location 208, which is the printing order transfer destination determination request source printing location, from the total number of printing locations managed by the order management server 207.

A processing time calculation table 703 (FIG. 11B) stores a result of calculation of the processing time of each printing order distribution method combination.

In step S804, the CPU 2001 of the order management server 207 sets a value "1" to a variable I. The variable I is a parameter value used for designating the combination number in the processing time calculation table 703 with respect to each printing order distribution method combination illustrated in FIG. 11B. Then, the processing advances to step S805.

In step S805, the CPU 2001 of the order management server 207 calculates the printing completion estimated time of all printing orders existing in each printing location after the printing orders are distributed.

More specifically, the CPU 2001 of the order management server 207 refers to printing order estimated time information about each printing order distribution destination printing location of each printing order, which is stored in a field of a row, in the processing time calculation table 703 (FIG. 11B), corresponding to the combination number for each printing order distribution method combination designated with the variable I.

Moreover, the CPU 2001 of the order management server 207 refers to the printing order estimated time information for the distribution destination printing location of each printing order to calculate the printing completion estimated time of all printing orders of each printing location after the printing orders are distributed.

After completing the calculation of the ordered printing completion estimated time of each printing location, the CPU 2001 of the order management server 207 calculates a value of an idle time, a difference between processing time lengths, and a processing completion time in the processing time calculation table 703.

A maximum value of the printing order processing completion estimated time after the printing orders are distributed is stored in the processing completion time field of the processing time calculation table 703 illustrated in FIG. 11B. In addition, the "difference between processing time lengths" field stores a value of the difference between a minimum value and a maximum value of the printing order processing completion estimated time after the printing orders are distributed.

A value of the idle time is a total value of the values of all printing locations calculated by subtracting the printing order processing completion estimated time of each printing location after the printing orders are distributed from the value of the processing completion time stored in the corresponding field of the processing time calculation table 703. More specifically, the idle time value is equivalent to the time length of suspension of the processing in each printing location before the processing in the entire printing system is completed.

After completing the above-described calculation, the processing advances to step S806. In step S806, the CPU 2001 of the order management server 207 increments the variable I by 1. Then, the processing advances to step S807.

In step S807, the CPU 2001 of the order management server 207 determines whether the variable I is equal to or smaller than the variable f. If it is determined that the variable I is equal to or smaller than the variable f (YES in step S807), then the processing advances to step S805. On the other hand, if it is determined that the variable I is greater than the variable f (NO in step S807), then the processing advances to step S808.

In step S808, the CPU 2001 of the order management server 207 notifies information about the printing order distribution method with which the processing loads of the printing locations after the printing orders are distributed become even to the print server 209 installed in the printing location 208, which is the printing order transfer destination determination request source printing apparatus.

The distribution method is determined by executing the flow of processing illustrated in FIG. 8. The content of the notification includes an ID of each printing order, a name of the transfer destination printing location, and an Internet protocol (IP) address of the transfer destination printing location.

The printing order distribution method with which the processing loads of the printing locations after the printing orders are distributed become even corresponds to the printing order distribution method stored in the processing time calculation table 703 for each printing order distribution method combination (FIG. 11B).

In the present exemplary embodiment, the idle time of the combination number "4" is fifteen minutes, which is the smallest of all the idle time values. Accordingly, the CPU 2001 of the order management server 207 selects the method of distributing the printing orders 1 and 3 to the printing location 212 and the printing order 2 to the printing location 216. After notifying the printing order transfer destination, the processing ends.

When the print server 209 installed in the printing location 208 receives the printing order transfer destination information from the order management server 207, then the print server 209 transfers the unprocessed printing orders to other printing locations according to the received printing order transfer destination information.

The unprocessed printing orders are transferred to the other printing locations by transferring the concerned printing orders to the printing location designated with the transfer destination printing location IP address, which is included in the printing order transfer destination information.

In the present exemplary embodiment, each printing location acquires the printing order transfer destination from the order management server and transfers the unprocessed printing orders. However, the present exemplary embodiment is not limited to this. More specifically, it is also useful if each printing location transfers the unprocessed printing order to the order management server and the order management server redistributes the printing orders again.

With the above-described configuration, if a failure has occurred in a printing location and thus the printing order cannot be processed in the failure-occurring printing location, the present exemplary embodiment can redistribute the printing orders to other available printing locations by considering the status of processing of the other printing locations.

Accordingly, even if any failure has occurred on a printing location apparatus and thus the printing apparatus cannot process (print) a printing order, the present exemplary embodiment can redistribute the printing order once distributed to the failed printing location apparatus to a printing location apparatus that normally operates. Thus, the present exemplary embodiment can level the processing loads of the entire printing system.

Now, a further exemplary embodiment of the present invention will be described in detail below. In a printing system according to the present exemplary embodiment, a print server in a printing location exists within a firewall and a direct transfer of a printing order from the order management server is restricted.

In the printing system according to the present exemplary embodiment, the order management server 207 receives printing orders placed from the host PCs 202 and 204, which are the plurality of printing order placement location apparatuses, via the network. In addition, the order management server 207 includes a printing order spooling area for each printing location apparatus.

As described above, the printing system according to the present exemplary embodiment restricts a direct access attempted from an external apparatus on the network by using a firewall. Accordingly, the present exemplary embodiment executes printing order receiving processing executed among the order management server 207 and each of the print servers 209, 213, and 217, which is different from that of the first exemplary embodiment.

More specifically, in the present exemplary embodiment, each of the print servers 209, 213, and 217 refers to the status stored on the RAM 2003 of the order management server 207 and notifies the printing order printing completion estimated time to the order management server 207, which is determined according to the acquired status.

In the printing system illustrated in FIG. 1, if the print servers 209, 213, and 217 installed in the printing locations 208, 212, and 216, respectively, are connected to the Internet 200 via the firewall, the transfer of printing orders from the order management server 207 to each print server is restricted in order to maintain high data security.

In the printing system according to the present exemplary embodiment, which has a configuration using the above-described effective security function, an output spooler corresponding to each of the printing locations 208, 212, and 216 is provided within the order management server 207 (e.g., on the HDD 2010). The order management server 207 spools the distributed printing orders in the output spooler corresponding to each printing location. The print server installed in each printing location periodically accesses the order management server 207 via the Internet 200 and the web server 206 installed in the order processing location 205 to acquire the status of the order management server 207 according to processing illustrated in FIG. 13.

FIG. 13 is a flow chart illustrating exemplary data processing executed by the information processing apparatus according to the present exemplary embodiment. The data processing illustrated in FIG. 13 is an example of print control executed by the print server installed in each printing location for acquiring the status of the order management server 207 by accessing the order management server 207.

Each step of the flow chart illustrated in FIG. 13 can be implemented with the CPU 2001 of the print server 209 by loading and executing the control program stored on the ROM 2002 and the HD 2011 on the RAM 2003.

Each of the print servers 209, 213, and 217 installed in the respective printing locations starts processing for acquiring the status of the order management server 207. The print servers 209, 213, and 217 execute similar processing in the present exemplary embodiment. Accordingly, the processing executed by the print server 209 is described in detail as typical processing.

Referring to FIG. 13, in step S901, the CPU 2001 of the print server 209 determines whether the present time is the time for acquiring the status of the order management server 207. The time for acquiring the status of the order management server 207 is previously designated. The time for acquiring the status of the order management server 207 can be designated per exact hour or at 30 minutes past the hour, for example, at a predetermined time interval.

If it is determined that it is not the time for acquiring the status of the order management server 207 (NO in step S901), then the CPU 2001 of the print server 209 repeats the processing in step S901 until it is the time for acquiring the status of the order management server 207. On the other hand, if it is determined that it is the time for acquiring the status of the order management server 207 (YES in step S901), then the processing advances to step S902.

In step S902, the CPU 2001 of the print server 209 acquires the status from the order management server 207 via the Internet 200 and the web server 206 installed in the order processing location 205. Furthermore, the CPU 2001 of the print server 209 stores the acquired status of the order management server 207 on the RAM 2003.

Each of the print servers 209, 213, and 217 issues a status transmission request to the order management server 207 in the above-described manner. The status of the order management server 207 includes statuses such as "Update", "Spool", and "Other". The status "Update" denotes a status of requiring updating of the printing order estimated time information. The status "Spool" indicates a status of waiting for distribution of printing orders. The status "Other" denotes other statuses.

After acquiring the status in the above-described manner, the processing advances to step S903. In step S903, the CPU 2001 of the print server 209 determines whether the status acquired from the order management server 207 is "Update".

If it is determined that the status acquired from the order management server 207 is not "Update" (NO in step S903), then the processing advances to step S904. On the other hand, if it is determined that the status acquired from the order management server 207 is "Update" (YES in step S903), then the processing advances to step S905.

In step S905, the CPU 2001 of the print server 209 notifies the printing order estimated time information to the order management server 207 via the web server 206. Then, the processing ends.

On the other hand, in step S904, the CPU 2001 of the print server 209 determines whether the status acquired from the order management server 207 is "Spool". If it is determined that the status acquired from the order management server 207 is not "Spool" (NO in step S904), then the processing ends. On the other hand, if it is determined that the status acquired from the order management server 207 is "Spool" (YES in step S904), then the processing advances to step S906.

In step S906, the CPU 2001 of the print server 209 itself accesses the order management server 207 to acquire the printing orders spooled in the output spooler corresponding to the print server 209. Then, the processing ends.

FIG. 14 is a flow chart illustrating exemplary data processing executed by the information processing apparatus according to the present exemplary embodiment. The data processing illustrated in FIG. 14 is an example of print control executed by the order management server 207 if a status transmission request is received from any of the print servers 209, 213, and 217.

Each step of the flow chart illustrated in FIG. 14 can be implemented with the CPU 2001 of the order management server 207 by loading and executing the control program stored on the ROM 2002 and the HD 2011 on the RAM 2003.

After receiving a status transmission request from each print server installed in each printing location, the order management server 207 starts the processing illustrated in FIG. 14. Referring to FIG. 14, in step S1001, the CPU 2001 of the order management server 207 determines whether a status transmission request has been received.

If it is determined that no status transmission request has been received (NO in step S1001), then the processing repeats the processing in step S1001 until a status transmission request is received. On the other hand, if it is determined that the status transmission request has been received (YES in step S1001), then the processing advances to step S1002.

In step S1002, the CPU 2001 of the order management server 207 verifies the last update time of the printing order estimated time information and the status of the printing orders spooled in the output spooler. Furthermore, if a length of time of or exceeding a predetermined time length has elapsed since the last update time of the printing order estimated time information, then the CPU 2001 of the order management server 207 sets the status "Update". On the other hand, if a printing order exists in the output spooler, then the CPU 2001 of the order management server 207 sets the status "Spool". In none of the above-described cases, the CPU 2001 of the order management server 207 sets the status "Other". Then, the processing advances to step S1003.

In step S1003, the CPU 2001 of the order management server 207 determines whether the status is "Update". If it is determined that the status is not "Update" (NO in step S1003), then the processing advances to step S1004. On the other hand, if it is determined that the status is "Update" (YES in step S1003), then the processing advances to step S1005.

In step S1005, the CPU 2001 of the order management server 207 transmits the status "Update" to the print server installed in the status transmission request source printing location. Then, the processing ends.

On the other hand, in step S1004, the CPU 2001 of the order management server 207 determines whether the status is "Spool". If it is determined that the status is not "Spool" (NO in step S1004), then the processing advances to step S1007. On the other hand, if it is determined that the status is "Spool" (YES in step S1004), then the processing advances to step S1006.

In step S1006, the CPU 2001 of the order management server 207 transmits the status "Spool" to the print server installed in the status transmission request source printing location. Then, the processing ends.

In step S1007, the CPU 2001 of the order management server 207 transmits the status "Other" to the print server installed in the status transmission request source printing location. Then, the processing ends.

In the present exemplary embodiment, the order management server 207 includes the output spooler corresponding to each printing location. In addition, in the present exemplary embodiment, the print server installed in each printing location can acquire the status of the order management server 207. With the above-described configuration, the present exemplary embodiment can execute the distribution of the printing orders having the effect similar to that of the first exemplary embodiment if the print server in each printing location is installed within a firewall.

The configuration of a data processing program that can be read by a data processing system including a data processing apparatus and an image processing apparatus according to an exemplary embodiment of the present invention is described below with reference to a memory map illustrated in FIG. 15.

Although not illustrated in FIG. 15, information for managing the programs stored in the storage medium such as version information and information concerning the creator of a program, for example, can be stored in the storage medium.

In addition, information that depends on an operating system (OS) of an apparatus that reads the program, such as an icon for identifying and displaying the program, can be stored in the storage medium.

In addition, data that is subordinate to the various programs is also managed in a directory of the storage medium. In addition, a program for installing the various programs on a computer can be stored in the storage medium. In addition, in the case where a program to be installed is compressed, a program for decompressing the compressed program can be stored in the storage medium.

In addition, the functions according to the above-described exemplary embodiments illustrated in FIGS. 3, 7, 8, 12, 13, and 14 can be implemented by a host computer using a program that is externally installed. In this case, the present invention is applied to the case where a group of information including a program is supplied to an output device from a storage medium such as a CD-ROM, a flash memory, and a floppy disk (FD) or from an external storage medium through a network.

The present invention can also be achieved by providing a system or an apparatus with a storage medium storing program code of software implementing the functions of the embodiments and by reading and executing the program code stored in the storage medium with a computer of the system or the apparatus (a CPU or a micro processing unit (MPU)).

In this case, the program code itself, which is read from the storage medium, implements the functions of the embodiments described above, and accordingly, the storage medium storing the program code constitutes the present invention.

Accordingly, the program can be configured in any form, such as object code, a program executed by an interpreter, and script data supplied to an OS.

As the storage medium for supplying such program code, a floppy disk, a hard disc, an optical disc, a magneto-optical disc (MO), a CD-ROM, a compact disc recordable (CD-R), a compact disc rewritable (CD-RW), a magnetic tape, a non-volatile memory card, a read only memory (ROM), and a digital versatile disc (DVD (DVD-recordable (DVD-R), DVD-rewritable (DVD-RW))), for example, can be used.

In this case, the program code itself, which is read from the storage medium, implements the function of the embodiments mentioned above, and accordingly, the storage medium storing the program code constitutes the present invention.

The above program can also be supplied by connecting to a web site on the Internet by using a browser of a client computer and by downloading the program from the web site to a storage medium such as a hard disk. In addition, the above program can also be supplied by downloading a compressed file that includes an automatic installation function from the web site to a storage medium such as a hard disk. The functions of the above embodiments can also be implemented by dividing the program code into a plurality of files and downloading each divided file from different web sites. That is, a World Wide Web (WWW) server and a file transfer protocol (ftp) server for allowing a plurality of users to download the program file for implementing the functional processing configure the present invention.

In addition, the above program can also be supplied by distributing a storage medium such as a CD-ROM and the like which stores the program according to the present invention after an encryption thereof; by allowing the user who is qualified for a prescribed condition to download key information for decoding the encryption from the web site via the Internet; and by executing and installing in the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-222616 filed Aug. 29, 2008, which is hereby incorporated by reference herein in its entirety.

What is claimed is:

1. A printing system comprising an order management server and a plurality of printing location apparatuses, the order management server configured to receive printing orders placed from a plurality of order placement location apparatuses via a network and to distribute the received printing orders to the plurality of printing location apparatuses via the network,
   wherein each printing location apparatus comprises a notification unit configured to notify a printing order estimated time, which is a time taken for completing processing of a printing order of each printing article that has been received from the order management server and is in a processing waiting state, to the order management server at a predetermined time interval, and
   wherein the order management server comprises:
      a storage unit configured to store a plurality of printing orders placed from the order placement location apparatuses;
      an updating unit configured to update printing order estimated time information according to each printing order estimated time notified from each printing location apparatus;
      a determination unit configured to determine a printing location apparatus or apparatuses to which to distribute the plurality of printing orders stored in the storage unit according to a content of each printing order placed from any of the order placement location apparatuses and the printing order estimated time information notified from the notification unit; and
      a transfer unit configured to transfer the printing orders stored in the storage unit to the printing location apparatus or apparatuses determined by the determination unit; and
   wherein the determination unit comprises:
      a combination calculation unit configured to calculate all combinations of methods for distributing the plurality of printing orders stored in the storage unit to the plurality of printing location apparatuses, which are managed by the order management server, based on the printing order estimated time information notified from each printing location apparatus;
      an estimated time calculation unit configured to calculate, with respect to each combination calculated by the combination calculation unit, an estimated time to be taken for completing processing of printing orders distributed to each printing location apparatus; and
      an idle time calculation unit configured to calculate an idle time based on a difference between a maximum value of the estimated time calculated by the estimated time calculation unit and the estimated time to be taken for completing the processing of each printing order distributed to each printing location apparatus, and
   wherein the determination unit is configured to select a combination with which a total of idle times of all of the printing location apparatuses becomes smallest.

2. The printing system according to claim 1, wherein if a plurality of combinations with which the total of idle times becomes smallest exists, the determination unit is configured to select a combination with which a difference between a maximum value and a minimum value of the estimated time becomes smallest.

3. The printing system according to claim 2, wherein if a plurality of combinations with which the total of idle times becomes smallest exists and, with respect to the plurality of combinations, the differences between the maximum value and the minimum value of the estimated time are the same, the determination unit is configured to select a combination with which the maximum value of the estimated time becomes smallest.

4. The printing system according to claim 1, wherein each printing location apparatus comprises:
   an inquiry unit configured to inquire, if the printing order received from the order management server cannot be processed by the printing location apparatus due to a failure occurring on the printing location apparatus, of the order management server a transfer destination of unprocessed printing order from the printing location apparatus; and
   a retransfer unit configured to retransfer the unprocessed printing order to another printing location apparatus corresponding to the transfer destination notified from the order management server in response to the inquiry by the inquiry unit.

5. The printing system according to claim 1, wherein each printing location apparatus includes a plurality of printing apparatuses and is configured to execute printing of the printing order on any printing apparatus.

6. A printing control method for a printing system including an order management server configured to receive printing orders placed from a plurality of order placement location apparatuses via a network and to distribute the received printing orders to a plurality of printing location apparatuses via the network, the printing control method comprising:

causing each printing location apparatus to notify a printing order estimated time, which is a time taken for completing processing of a printing order of each printing article that has been received from the order management server and is in a processing waiting state, to the order management server at a predetermined time interval; and causing the order management server, including a storage unit configured to store a plurality of printing orders placed from the order placement location apparatuses, to perform operations comprising:

updating printing order estimated time information according to each printing order estimated time notified from each printing location apparatus;

determining a printing location apparatus or apparatuses to which to distribute the plurality of printing orders stored in the storage unit according to a content of each printing order placed from any of the order placement location apparatuses and the notified printing order estimated time information; and transferring the printing orders stored in the storage unit to the determined printing location apparatus or apparatuses; and wherein the determining comprises:

calculating all combinations of methods for distributing the plurality of printing orders stored in the storage unit to the plurality of printing location apparatuses, which are managed by the order management server, based on the printing order estimated time information notified from each printing location apparatus;

calculating, with respect to each calculated combination, an estimated time to be taken for completing processing of printing orders distributed to each printing location apparatus; and calculating an idle time based on a difference between a maximum value of the estimated time calculated by the estimated time calculation unit and the estimated time to be taken for completing the processing of each printing order distributed to each printing location apparatus, and wherein a combination is selected with which a total of idle times of all of the printing location apparatuses becomes smallest.

7. A non-transitory computer-readable storage medium storing instructions which cause a computer to execute the printing control method according to claim 6.

8. A printing system comprising a management server and a plurality of printing apparatuses, the management server configured to receive print jobs issued from a plurality of client apparatuses via a network and to selectively distribute the received print jobs to the plurality of printing apparatuses via the network, wherein each printing apparatus comprises a notification unit configured to periodically notify a printing estimated time taken for completing processing of a print job that is in a processing waiting state to the management server, and wherein the management server comprises:

a storage unit configured to store a plurality of printing orders placed from the client apparatuses;

an updating unit configured to update estimated time information according to each printing estimated time notified from each printing apparatus;

a determination unit configured to determine a printing apparatus or apparatuses to which to distribute the plurality of printing orders stored in the storage unit according to a content of the print job input from any client apparatus and the printing estimated time information notified from the notification unit; and a transfer unit configured to transfer the printing orders stored in the storage unit to the printing apparatus or apparatuses determined by the determination unit; and wherein the determination unit comprises:

a combination calculation unit configured to calculate all combinations of methods for distributing the plurality of printing orders stored in the storage unit to the plurality of printing location apparatuses, which are managed by the order management server, based on the printing order estimated time information notified from each printing location apparatus;

an estimated time calculation unit configured to calculate, with respect to each combination calculated by the combination calculation unit, an estimated time to be taken for completing processing of printing orders distributed to each printing location apparatus; and an idle time calculation unit configured to calculate an idle time based on a difference between a maximum value of the estimated time calculated by the estimated time calculation unit and the estimated time to be taken for completing the processing of each printing order distributed to each printing location apparatus, and wherein the determination unit is configured to select a combination with which a total of idle times of all of the printing location apparatuses becomes smallest.

* * * * *